United States Patent
Zhang et al.

(10) Patent No.: US 12,548,753 B2
(45) Date of Patent: Feb. 10, 2026

(54) ELECTRODE PLATE MASS DETECTION METHOD, COATING METHOD, APPARATUS, DEVICE, SYSTEM, AND MEDIUM

(71) Applicant: CONTEMPORARY AMPEREX TECHNOLOGY (HONG KONG) LIMITED, Hong Kong (CN)

(72) Inventors: Jingdong Zhang, Ningde (CN); Zhihui Zhen, Ningde (CN); Qiangjun Wang, Ningde (CN); Weigang Chen, Ningde (CN); Bingyang Zhan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 82 days.

(21) Appl. No.: 18/677,881

(22) Filed: May 30, 2024

(65) Prior Publication Data

US 2024/0322108 A1 Sep. 26, 2024

Related U.S. Application Data

(63) Continuation of application No. PCT/CN2022/131839, filed on Nov. 15, 2022.

(51) Int. Cl.
*G01N 9/36* (2006.01)
*H01M 4/04* (2006.01)

(52) U.S. Cl.
CPC ............ *H01M 4/0404* (2013.01); *G01N 9/36* (2013.01)

(58) Field of Classification Search
CPC . H01M 4/0404; G01N 9/36; G01N 2223/053; G01N 2223/1013; G01N 2223/316; G01N 2223/3301; G01N 23/203; G01N 9/24
See application file for complete search history.

(56) References Cited

U.S. PATENT DOCUMENTS

| 12,406,976 B2* | 9/2025 | Hamaguchi ............ B41J 29/393 |
| 2022/0358652 A1 | 11/2022 | Torii |
| 2023/0117277 A1* | 4/2023 | Liu ...................... A61N 5/1065 378/65 |

(Continued)

FOREIGN PATENT DOCUMENTS

| CN | 105403581 A | 3/2016 |
| CN | 106798565 A | 6/2017 |

(Continued)

OTHER PUBLICATIONS

The extended European search report received in the counterpart European Application 22962925.8, mailed on Feb. 6, 2024.

(Continued)

*Primary Examiner* — Freddie Kirkland, III
(74) *Attorney, Agent, or Firm* — K&L Gates LLP

(57) ABSTRACT

This application provides an electrode plate mass detection method, coating method, apparatus, device, system, and medium, pertaining to the field of battery technologies. The method includes: controlling a surface density gauge to create radiation surfaces of different shapes on an electrode plate; obtaining surface density information corresponding to the radiation surfaces; and determining mass information of the electrode plate based on the surface density information.

14 Claims, 16 Drawing Sheets

(56) References Cited

U.S. PATENT DOCUMENTS

2024/0153665 A1* 5/2024 Zhen .................... G21F 5/04
2025/0198952 A1* 6/2025 Zhan .................... G01B 15/02

FOREIGN PATENT DOCUMENTS

| | | | |
|---|---|---|---|
| CN | 110243723 | A | 9/2019 |
| CN | 210575146 | U | 5/2020 |
| CN | 112756217 | A | 5/2021 |
| CN | 219015981 | U | 5/2023 |
| EP | 4390973 | A1 | 6/2024 |

OTHER PUBLICATIONS

International Search Report received in the corresponding International Application PCT/CN2022/131839, mailed Jul. 18, 2023.

* cited by examiner

S11

During scanning of an electrode plate by a surface density gauge, control a position detector to detect position information of the surface density gauge relative to the electrode plate — S113

Based on the position information, control a driving mechanism of a collimator to drive a shield plate to move — S114

Obtain a mass relationship coefficient between a coating region of an electrode plate and a blank region of the electrode plate — S31

Determine mass information of the electrode plate based on surface density information and the mass relationship coefficient — S32

FIG. 13

ELECTRODE PLATE MASS DETECTION METHOD, COATING METHOD, APPARATUS, DEVICE, SYSTEM, AND MEDIUM

CROSS-REFERENCE TO RELATED APPLICATION

This application is a continuation of International Application No. PCT/CN2022/131839, filed on Nov. 15, 2022, which is hereby incorporated by reference in its entirety.

TECHNICAL FIELD

This application relates to the field of battery technologies, and in particular, to an electrode plate mass detection method, coating method, apparatus, device, system, and medium.

BACKGROUND

A radioactive source refers to a substance or entity made of radioactive material that can produce radiation exposure. Radioactive sources have been widely used in fields such as industry, agriculture, healthcare, isotope instrumentation, and scientific research. For example, a surface density gauge includes a radioactive source and a detector. When rays emitted by the radioactive source penetrate an object under test, the rays are reflected, scattered, and absorbed by the object under test, resulting in a certain attenuation of intensity of the transmitted rays detected by the detector compared to intensity of the incident rays. By measuring the intensities of the rays before and after penetration, the surface density of the object under test can be inferred. The radioactive source is placed in a radioactive source kit, the radioactive source kit is provided with a predetermined opening, and the rays emitted by the radioactive source are emitted through the predetermined opening and projected onto the object under test. Radioactive source kits are widely used in various testing instruments such as surface density gauges.

In the production of battery electrode plates, the surface density of an electrode plate can be detected using a surface density gauge, then the net weight of slurry on the electrode plate is determined based on the density of the electrode plate, and a coating mass is reflected by the net weight of the slurry. Due to the influence of the material of the electrode plate and the coating process, the surface density of the electrode plate is not uniform, which affects the accuracy of the net weight testing for the electrode plate, consequently affecting the coating mass. Improving the accuracy of net weight testing for electrode plates has become an urgent technical issue to be solved.

SUMMARY

This application is intended to resolve at least one of the technical problems in the background. One objective of this application is to provide an electrode plate mass detection method, coating method, apparatus, device, system, and medium so as to relieve the problem of inaccurate determination of the mass of electrode plates in related technologies.

Embodiments of a first aspect of this application provide an electrode plate mass detection method, where the method includes: controlling a surface density gauge to create radiation surfaces of different shapes on an electrode plate; obtaining surface density information corresponding to the radiation surfaces; and determining mass information of the electrode plate based on the surface density information.

In the technical solution of the embodiments of this application, in a detection process, the shapes of the radiation surfaces can be adjusted according to different positions of the electrode plate, so that the shapes of the radiation surfaces are more suitable for the electrode plate, and then the surface density information obtained according to the radiation surfaces is more accurate. Thus, the mass information of the electrode plate determined based on the surface density information is more accurate.

In some embodiments, the surface density gauge includes a collimator, the collimator including a shield plate and a driving mechanism; where the controlling a surface density gauge to create radiation surfaces of different shapes on an electrode plate includes: controlling the driving mechanism to drive the shield plate to move so as to adjust the shapes of the radiation surfaces created by the surface density gauge on the electrode plate. The driving mechanism is configured to drive the shield plate to move, making it more convenient to adjust the shapes of the radiation surfaces of the rays emitted by the radioactive source by blocking the ray outlet through the shield plate.

In some embodiments, the surface density gauge further includes a radioactive source kit and a detector, the radioactive source kit and the detector satisfying at least one of the following conditions: the rays emitted by the radioactive source kit are projected onto the electrode plate after passing through the collimator; and the detector receives the rays passing through the electrode plate and then the collimator. Placing the collimator on either the radioactive source kit side or the detector side can achieve the effect of adjusting the shapes of the radiation surfaces.

In some embodiments, the shield plate is provided with a window, and when rays emitted by the radioactive source kit of the surface density gauge are projected onto the electrode plate after passing through the collimator, the controlling the driving mechanism to drive the shield plate to move so as to adjust the shapes of the radiation surfaces created by the surface density gauge on the electrode plate includes: controlling the driving mechanism to drive the shield plate to move so that the rays are able to pass through the window and be projected onto the electrode plate. Through the provision of a window, the shapes of the radiation surfaces can be changed by changing the shape of the window.

In some embodiments, the shield plate is provided with a plurality of windows, where the plurality of windows include a first sub-window and a second sub-window, the first sub-window and the second sub-window having different shapes; and the controlling the driving mechanism to drive the shield plate to move so that the rays are able to pass through the window and be projected onto the electrode plate includes: controlling the driving mechanism to drive the shield plate to move so that the rays are able to pass through either the first sub-window or the second sub-window and be projected onto the electrode plate. Radiation surfaces of the radioactive source on the electrode plate can be adjusted by changing the positions of the first sub-window or the second sub-window, thereby achieving the adjustment of the shapes of the radiation surfaces.

In some embodiments, the controlling the driving mechanism to drive the shield plate to move so as to adjust the shapes of the radiation surfaces created by the surface density gauge on the electrode plate includes: controlling the driving mechanism to drive the shield plate to move so as to adjust a shielding area of the shield plate against rays projected to the collimator in an optical axis direction of the surface density gauge. The shielding area of the shield plate to the ray outlet can be adjusted to adjust the shapes of the radiation surfaces.

In some embodiments, the electrode plate includes a plurality of blank regions and at least one coating region arranged along a width direction of the electrode plate, the coating region(s) and the blank regions are arranged alternately, and the surface density gauge is configured to scan the electrode plate along the width direction of the electrode plate and create radiation surfaces on the electrode plate during the scanning. The controlling a surface density gauge to create radiation surfaces of different shapes on an electrode plate includes: during the scanning of the electrode plate by the surface density gauge, controlling the surface density gauge to create a first radiation surface in the blank region of the electrode plate; and during the scanning of the electrode plate by the surface density gauge, controlling the surface density gauge to create a second radiation surface in the coating region of the electrode plate; where, in the width direction of the electrode plate, width of the first radiation surface is less than width of the blank region, and width of the second radiation surface is less than width of the coating region. The width of the first radiation surface is smaller than the width of the blank region, ensuring that the first radiation surface can completely fall within the blank region, preventing the first radiation surface from falling within the coating region and affecting the detection result. The width of the second radiation surface is smaller than the width of the coating region, enabling the second radiation surface to fall completely within the coating region.

In some embodiments, during one scan of the electrode plate by the surface density gauge, the first radiation surface and the second radiation surface have different shapes. During scanning, the first radiation surface or the second radiation surface is adjusted depending on different regions of the electrode plate, allowing for simultaneous testing of the blank regions and the coating regions in one scan.

In some embodiments, during one scan of the electrode plate by the surface density gauge, the first radiation surface and the second radiation surface have a same shape, and during two consecutive scans of the electrode plate by the surface density gauge, the first radiation surface and the second radiation surface have different shapes. During scanning, radiation surfaces of one shape can be created in one scan and radiation surface of another shape can be created in the next scan, allowing for the testing of both the blank regions and coating regions of the electrode plate. In addition, during one scan, creating both first radiation surfaces and second radiation surfaces can also enable the testing of both the blank regions and the coating regions of the electrode plate.

In some embodiments, when the surface density gauge includes a collimator, the surface density gauge further includes a position detector. The controlling the driving mechanism of the collimator to drive the shield plate to move includes: during scanning of the electrode plate by the surface density gauge, controlling the position detector to detect position information of the surface density gauge relative to the electrode plate; and based on the position information, controlling the driving mechanism of the collimator to drive the shield plate to move. The position detector is configured to detect position of the radioactive source kit and generate a detection result based on the position of the radioactive source, and the driving mechanism performs, based on the detection result of the position detector, an operation of driving the collimator to adjust the shapes of the radiation surfaces of the rays emitted by the radioactive source, such that the shapes of the radiation surfaces can be automatically adjusted based on the position detected by the position detector, achieving automatic adjustment and greater convenience.

In some embodiments, the determining mass information of the electrode plate based on the surface density information includes: obtaining a mass relationship coefficient between the coating region of the electrode plate and the blank region of the electrode plate; and determining the mass information of the electrode plate based on the surface density information and the mass relationship coefficient. The masses of electrode plate corresponding to different radiation surfaces can be determined based on the surface density information. For an electrode plate coated with slurry, mass of the electrode plate includes the mass of foil and the mass of slurry. The mass of foil can be determined based on the mass relationship coefficient. The mass of slurry can be determined based on the masses of electrode plate and the mass of foil, and thereby, the mass of the electrode plate can be determined.

In some embodiments, the surface density gauge includes a first surface density gauge, the mass information includes mass of slurry applied onto a first surface of the electrode plate, and the mass relationship coefficient is a mass relationship coefficient between the coating region of the electrode plate and the blank region of the electrode plate determined when the first surface of the electrode plate is uncoated with slurry. The controlling a surface density gauge to create radiation surfaces of different shapes on an electrode plate includes: when the first surface of the coating region is coated with slurry, controlling the first surface density gauge to scan the electrode plate along the width direction of the electrode plate. The obtaining surface density information corresponding to the radiation surfaces includes: when the first surface of the coating region is coated with slurry, detecting a first surface density corresponding to the first radiation surface created by the first surface density gauge in the blank region and a second surface density corresponding to the second radiation surface created by the first surface density gauge in the coating region. The determining mass information of the electrode plate based on the surface density information and the mass relationship coefficient includes: determining mass of slurry on the first surface based on the first surface density, the second surface density, and the mass relationship coefficient. The mass of foil in the coating region can be easily determined based on the mass relationship coefficient. Then, the mass of slurry can be determined based on the mass of foil.

In some embodiments, the controlling a surface density gauge to create radiation surfaces of different shapes on an electrode plate includes: when the first surface of the electrode plate is uncoated with slurry, controlling the first surface density gauge to scan the electrode plate along the width direction of the electrode. The obtaining surface density information corresponding to the radiation surfaces includes: when the first surface of the electrode plate is uncoated with slurry, detecting a third surface density corresponding to the first radiation surface created by the first surface density gauge in the blank region of the electrode plate and a fourth surface density corresponding to the second radiation surface created by the first surface density gauge in the coating region of the electrode plate. The mass relationship coefficient is determined based on area of the first radiation surface, area of the second radiation surface, the third surface density, and the fourth surface density detected when the first surface of the electrode plate is uncoated with slurry. According to the foregoing method, it is easy to determine the mass of electrode plate corresponding to the first radiation surface and the mass of electrode plate corresponding to the second radiation surface when the first surface of the electrode plate is not applied with slurry, and thus determine the mass relationship coefficient.

In some embodiments, the mass relationship coefficient includes a mass relationship sub-coefficient between each coating region of the electrode plate and the blank region of the electrode plate adjacent to the coating region, determined when the first surface of the electrode plate is uncoated with slurry. The determining mass of slurry on the first surface based on the first surface density, the second surface density, and the mass relationship coefficient includes: determining the mass of slurry on the first surface based on the first surface density, the second surface density, and the mass relationship coefficient corresponding to the at least one coating region. Each coating region is located close to a blank region adjacent to the coating region, and the foil experiences minimal fluctuations in the connected positions, resulting in significant differences in surface density. This allows for a more accurate mass relationship sub-coefficient between each coating region of the electrode plate and the blank region of the electrode plate adjacent to the coating region. As a result, the calculated mass is more accurate.

In some embodiments, during one scan of the electrode plate by the first surface density gauge, the first radiation surface and the second radiation surface have different shapes; alternatively, during one scan of the electrode plate by the first surface density gauge, the first radiation surface and the second radiation surface have a same shape, and during two consecutive scans of the electrode plate by the surface density gauge, the first radiation surface and the second radiation surface have different shapes. During scanning, radiation surfaces of one shape can be created in one scan and radiation surfaces of another shape can be created in the next scan, allowing for the testing of both the blank regions and coating regions of the electrode plate. Similarly, during one scan, creating both first radiation surfaces and second radiation surfaces can also enable the testing of both the blank regions and the coating regions of the electrode plate.

In some embodiments, the surface density gauge further includes a second surface density gauge, and the mass information further includes mass of slurry applied onto a second surface of the electrode plate, the first surface and the second surface being two opposite surfaces of the electrode plate. The controlling a surface density gauge to create radiation surfaces of different shapes on an electrode plate further includes: when both the first surface and the second surface of the coating region are coated with slurry, controlling the second surface density gauge to scan the electrode plate along the width direction of the electrode plate. The obtaining surface density information corresponding to the radiation surfaces further includes: when both the first surface and the second surface of the coating region are coated with slurry, detecting a fifth surface density corresponding to the second radiation surface created by the second surface density gauge in the coating region. The determining mass information of the electrode plate based on the surface density information includes: determining the mass of slurry on the second surface based on the second surface density and the fifth surface density. According to the foregoing method, it is easy to determine the mass of electrode plate corresponding to the second radiation surface in the coating region when both the first surface and the second surface of the coating region are coated with slurry, and thereby the mass of slurry on the second surface can be determined.

In some embodiments, during one scan of the electrode plate by the second surface density gauge, the second radiation surface varies in shape; or, during one scan of the electrode plate by the second surface density gauge, the second radiation surface maintains a consistent shape, and during two consecutive scans of the electrode plate by the surface density gauge, the second radiation surface varies in shape. During scanning, radiation surfaces of one shape can be created in one scan and radiation surfaces of another shape can be created in the next scan, allowing for the testing of both the blank regions and coating regions of the electrode plate 70. Similarly, during one scan, creating second radiation surfaces of different shapes can also enable the testing of both the blank regions and the coating regions of the electrode plate.

In some embodiments, scanning tracks of the first surface density gauge and the second surface density gauge on the electrode plate include a plurality of test points, and the rays emitted by the first surface density gauge and the second surface density gauge are projected onto the electrode plate at each of the test points. Positions of a plurality of radiation surfaces created by the first surface density gauge on the electrode plate during one scan correspond one-to-one to positions of a plurality of radiation surfaces created by the second surface density gauge on the electrode plate during one scan. Because the second radiation surfaces created on the electrode plate by the first surface density gauge and the second radiation surfaces created on the electrode plate by the second surface density gauge have the same positions and shape, detection at the same points is achieved, resulting in higher accuracy.

In some embodiments, the first radiation surface is a rectangle, and the second radiation surface is a circle, with length of a side of the rectangle in the width direction C of the electrode plate smaller than diameter of the circle. The first radiation surface is located in the blank region, while the second radiation surface is located in the coating region. The blank region has a smaller width. By setting the first radiation surface to the shape of a rectangle, the width of the rectangle can be adjusted to ensure that the first radiation surface completely falls within the blank region. The coating region has a larger width and the circular shape has a larger size, allowing for more accurate detection of the surface density.

In some embodiments, the rectangle and the circle satisfy at least one of the following conditions: the width of the rectangle is greater than or equal to 5 millimeters and less than or equal to 20 millimeters; and the diameter of the circle is greater than or equal to 10 millimeters and less than or equal to 40 millimeters. Limiting the width of the rectangle allows the size of the first radiation surface to fit into the blank region, and limiting the size of the circle allows the size of the second radiation surface to fit into the coating region.

In some embodiments, the electrode plate further includes thinned regions, and along the width direction of the electrode plate, the thinned regions are located on two sides of the coating region and between the blank region and the coating region; and when the surface density gauge includes a collimator, the controlling the driving mechanism to drive the shield plate to move so as to adjust the shapes of the radiation surfaces created by the surface density gauge on the electrode plate includes: in the thinned regions, controlling the driving mechanism to drive the shield plate to move so as to adjust the surface density gauge to create a first radiation surface in the blank region of the electrode plate and a second radiation surface in the coating region. The switching needs to occur in the thinned regions to avoid affecting the detection accuracy for the coating region.

Embodiments of a second aspect of this application provide an electrode plate production method, including: applying slurry onto a coating region of an electrode plate; and detecting mass information of the electrode plate using the method in the foregoing embodiments. After slurry is applied onto the electrode plate, mass information of the electrode plate can be detected using the method in the foregoing embodiments. Then, based on the mass information of the electrode plate, the mass of the coating can be determined.

In some embodiments, the applying slurry onto a coating region of an electrode plate includes: using a first coater to apply slurry onto a coating region of a first surface of the electrode plate; and using a second coater to apply slurry onto a coating region of a second surface of the electrode plate, the second surface being opposite the first surface. The surface density gauge includes a first surface density gauge positioned after the first coater and a second surface density gauge positioned after the second coater; and the detecting mass information of the electrode plate includes: before slurry is applied onto the coating region of the first surface of the electrode plate, using the first surface density gauge to create a radiation surface of a first shape in the blank region of the electrode plate and a radiation surface of a second shape in the coating region of the electrode plate; after slurry is applied onto the coating region of the first surface of the electrode plate, using the first surface density gauge to create a radiation surface of a second shape in the coating region of the electrode plate; and after slurry is applied onto the coating region of the second surface of the electrode plate, using the second surface density gauge to create a radiation surface of the second shape in the coating region of the electrode plate; where the first shape is different from the second shape. According to the foregoing method, the shapes of radiation surfaces can be adjusted according to different positions of the electrode plate, so that the shapes of the radiation surfaces are more suitable for the electrode plate, and the surface density information obtained based on the radiation surfaces is more accurate, so that the mass information of the electrode plate determined based on the surface density information is more accurate.

Embodiments of a third aspect of this application provide an electrode plate mass detection apparatus, where the apparatus includes: a control module, configured to control a surface density gauge to create radiation surfaces of different shapes on an electrode plate; an obtaining module, configured to obtain surface density information corresponding to the radiation surfaces; and a determining module, configured to determine mass information of the electrode plate based on the surface density information.

Embodiments of a fourth aspect of this application provide an electronic device including: at least one processor; and a memory communicatively connected to the at least one processor; where, the memory stores instructions which are executable by the at least one processor, and when the instructions are executed by the at least one processor, the at least one processor is enabled to perform the method in the foregoing embodiments.

Embodiments of a fifth aspect of this application provide an electrode plate production system including the electronic device in the foregoing embodiments.

In some embodiments, the electrode plate production system further includes: a coater, configured to apply slurry onto a coating region of a surface of the electrode plate; and a surface density gauge, configured to create a radiation surface of a first shape in a blank region of the electrode plate and a radiation surface of a second shape in a coating region of the electrode plate; where the first shape is different from the second shape.

In some embodiments, the coater includes: a first coater, configured to apply slurry onto a coating region of a first surface of the electrode plate; and a second coater, configured to apply slurry onto a coating region of a second surface of the electrode plate, the second surface being opposite the first surface; The surface density gauge includes: a first surface density gauge, positioned after the first coater, where the first surface density gauge is configured to create a radiation surface of the first shape in the blank region of the electrode plate and a radiation surface of the second shape in the coating region of the electrode plate when the first surface is uncoated with slurry; and the first surface density gauge is configured to create a radiation surface of the second shape in the coating region of the electrode plate when the first surface is coated with slurry; and a second surface density gauge, positioned after the second coater, where the second surface density gauge is configured to create a radiation surface of the second shape in the coating region of the electrode plate when the second surface is coated with slurry. The electrode plate production system provided in the embodiments of this application can detect the masses of slurry applied onto two surfaces using only two density gauges. This reduces the number of density gauges required, simplifies the structure, and saves costs.

In some embodiments, the electrode plate production system further includes: a coater, configured to apply slurry onto a coating region of a surface of the electrode plate; and a first surface density gauge, configured to create a radiation surface of a first shape in a blank region of the electrode plate; and a second surface density gauge, configured to create a radiation surface of a second shape in a coating region of the electrode plate; where the first shape is different from the second shape.

Embodiments of a sixth aspect of this application provide a computer-readable storage medium storing a computer program, where when the computer program is executed by a processor, the method in the foregoing embodiments is implemented.

Embodiments of a seventh aspect of this application provide a computer program product including a computer program, where when the computer program is executed by a processor, the method in the foregoing embodiments is executed.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

In the accompanying drawings, unless otherwise specified, the same reference signs denote the same or similar components or elements throughout the accompanying drawings. The accompanying drawings are not necessarily drawn to scale. It should be understood that these accompanying drawings describe merely some embodiments disclosed in this application, and should not be construed as any limitation on the scope of this application.

FIG. 12 is a flowchart of an electrode plate mass detection method according to some embodiments of this application;

FIG. 13 is a flowchart of an electrode plate mass detection method according to some embodiments of this application;

DESCRIPTION OF REFERENCE SIGNS

Figure 1:
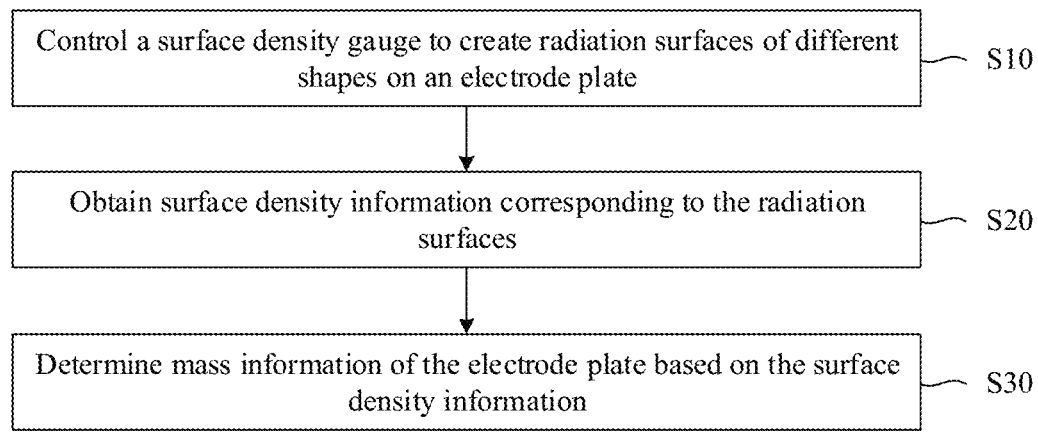
FIG. 1 is a flowchart of an electrode plate mass detection method according to some embodiments of this application.

1. collimator; 11. shield plate; 111. first sub-shield plate; 112. second sub-shield plate; 12. driving mechanism; 13. window; 131. first sub-window; 132. second sub-window; 14. rotating center; 2. protective holder; 21. accommodating groove; 22. predetermined opening; 5. position detector; 7. detection element; 10. radioactive source kit; 20. radioactive source; 30. detector; 601. first surface density gauge; 602. second surface density gauge; 70. electrode plate; 701. blank region; 702. coating region; 901. first radiation surface; 902. second radiation surface; 110. first coater; 120. second coater; 301. control module; 302. obtaining module; and 303. determining module.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the description of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal" "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of the description of the embodiments of this application rather than indicating or implying that the means or components mentioned must have specific orientations, or must be constructed or manipulated according to specific orientations, and therefore shall not be construed as any limitations on embodiments of this application.

In the description of the embodiments of this application, unless otherwise specified and defined explicitly, the technical terms "mount", "connect", "join", and "fasten" should be understood in their general senses. For example, they may refer to a fixed connection, a detachable connection, or an integrated connection, may refer to a mechanical connection or an electrical connection, and may refer to a direct connection, an indirect connection through an intermediate medium, an internal connection between two elements, or an interaction between two elements. Persons of ordinary skill in the art can understand specific meanings of these terms in the embodiments of this application as appropriate to specific situations.

Currently, from the perspective of market development, application of traction batteries is becoming increasingly extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With the continuous expansion of application fields of traction batteries, market demands for the traction batteries are also expanding.

The applicant has noted that in production of battery electrode plates, a surface density gauge is used to detect the mass of slurry on an electrode plate. During the detection, radiation surfaces are created on the electrode plate by a radioactive source of the surface density gauge. The electrode plate includes coating regions and blank regions that are alternately arranged, with width of the coating region larger than width of the blank region. For the blank region with smaller width, the surface density gauge is required to create a small radiation surface, so as to ensure that the entire radiation surface falls within the blank region, and prevent the radiation surface from falling to the coating region and affecting the mass detection for the blank region. For the coating region with larger width, the surface density gauge is required to create a large radiation surface, so as to avoid an excessively small radiation surface affecting accuracy. However, in the related art, radiation surfaces created on an electrode plate by a surface density gauge have fixed size and shape, which makes it impossible for the surface density gauge to test the coating regions and blank regions of the electrode plate simultaneously.

The applicant has proposed through research a collimator. The collimator includes a shield plate and a driving mechanism. The shield plate is configured to control radiation surfaces of rays emitted by a radioactive source, and the rays emitted by the radioactive source are emitted through a predetermined opening. The driving mechanism is connected to the shield plate, and the driving mechanism is configured to drive the shield plate to adjust shapes of the radiation surfaces of the rays emitted by the radioactive source. When the collimator is applied to a surface density gauge, the shapes of the radiation surfaces created by the rays emitted by the radioactive source can be adjusted according to the shape of an object under test, such that the surface density gauge can measure objects with different shapes, improving adaptability of the surface density gauge.

Embodiments of this application provide an electrode plate mass detection method. FIG. 1 is a flowchart of an electrode plate mass detection method according to some embodiments of this application. Referring to FIG. 1, the method includes:

Step S10: Control a surface density gauge to create radiation surfaces of different shapes on an electrode plate.

Step S20: Obtain surface density information corresponding to the radiation surfaces.

Step S30: Determine mass information of the electrode plate based on the surface density information.

In the embodiments of this application, the surface density gauge creates radiation surfaces of different shapes on the electrode plate, indicating that the surface density gauge creates at least two types of radiation surfaces on the electrode plate. For example, the surface density gauge creates two types of radiation surfaces on the electrode plate. The radiation surface refers to a radiation surface detected by the surface density gauge after the rays pass through the electrode plate.

In the embodiments of this application, radiation surfaces having different shapes include at least one of: radiation surfaces having different sizes; and radiation surfaces having different shapes.

For example, the two types of radiation surfaces may have different sizes but the same shape, such as both radiation surfaces being circular but having different diameters. Alternatively, the two types of radiation surfaces have different sizes and different shapes, such as one being rectangle and the other being circular. Alternatively, the two types of radiation surfaces have the same size but different shapes. For example, one is an acute-angled triangle and the other is an obtuse-angled triangle, but the acute-angled triangle and the obtuse-angled triangle are equal in area.

In an implementation of the embodiments of this application, the surface density information can be calculated by the surface density gauge. During the scanning of the electrode plate, the surface density gauge creates radiation surfaces on the electrode plate and then calculates the surface density information of the radiation surfaces.

In another implementation of the embodiments of this application, during the scanning of the electrode plate, the surface density gauge creates radiation surfaces on the electrode plate, and then outputs the detected data to another device (for example, a computer), and the other device calculates the surface density information based on the data.

In the embodiments of this application, the surface density gauge can be adjusted according to the object under test to create radiation surfaces of different shapes on the electrode plate. The surface density information is determined according to the radiation surfaces of different shapes, and finally, the mass information of the electrode plate is determined according to the surface density information. In this way, in the detection process, the shapes of the radiation surfaces can be adjusted according to different positions of the electrode plate, so that the shapes of the radiation surfaces are more suitable for the electrode plate, and then the surface density information obtained according to the radiation surfaces is more accurate. Thus, the mass information of the electrode plate determined based on the surface density information is more accurate.

Figure 2:
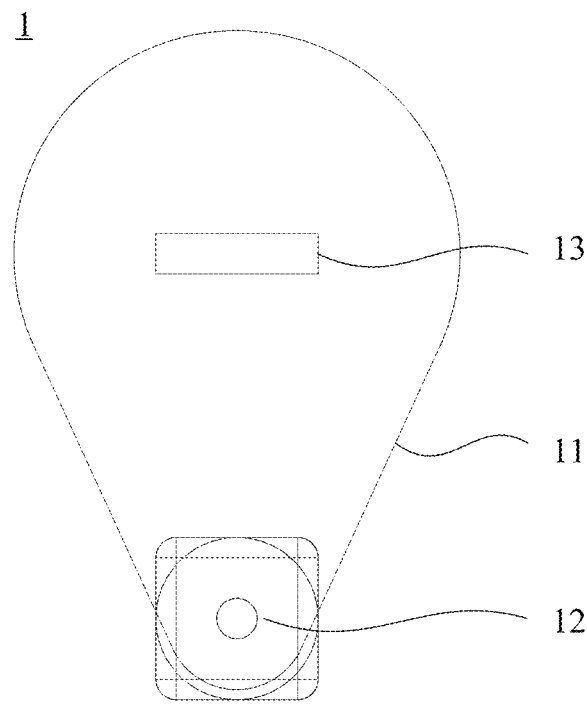
FIG. 2 is a schematic structural diagram of a collimator according to an embodiment of this application.

According to some embodiments of this application, the surface density gauge includes a collimator 1. FIG. 2 is a schematic structural diagram of a collimator according to an embodiment of this application. Referring to FIG. 2, a collimator 1 includes a shield plate 11 and a driving mechanism 12.

In an implementation of the embodiments of this application, step S10 includes:

Step S11: Control the driving mechanism to drive the shield plate to move so as to adjust the shapes of the radiation surfaces created by the surface density gauge on the electrode plate.

For example, the driving mechanism 12 is connected to the shield plate 11, the driving mechanism 12 may be a motor, and a transmission shaft of the motor is connected to the shield plate 11 to control the shield plate to move. The motor is an easily obtainable power source that is easy to install and cost-effective. It can reduce the manufacturing cost of the collimator 1.

In the embodiments of this application, the driving mechanism 12 is configured to drive the shield plate 11 to move, making it more convenient to adjust the shapes of the radiation surfaces of the rays emitted by the radioactive source by blocking the ray outlet with the shield plate 11.

Figure 3:
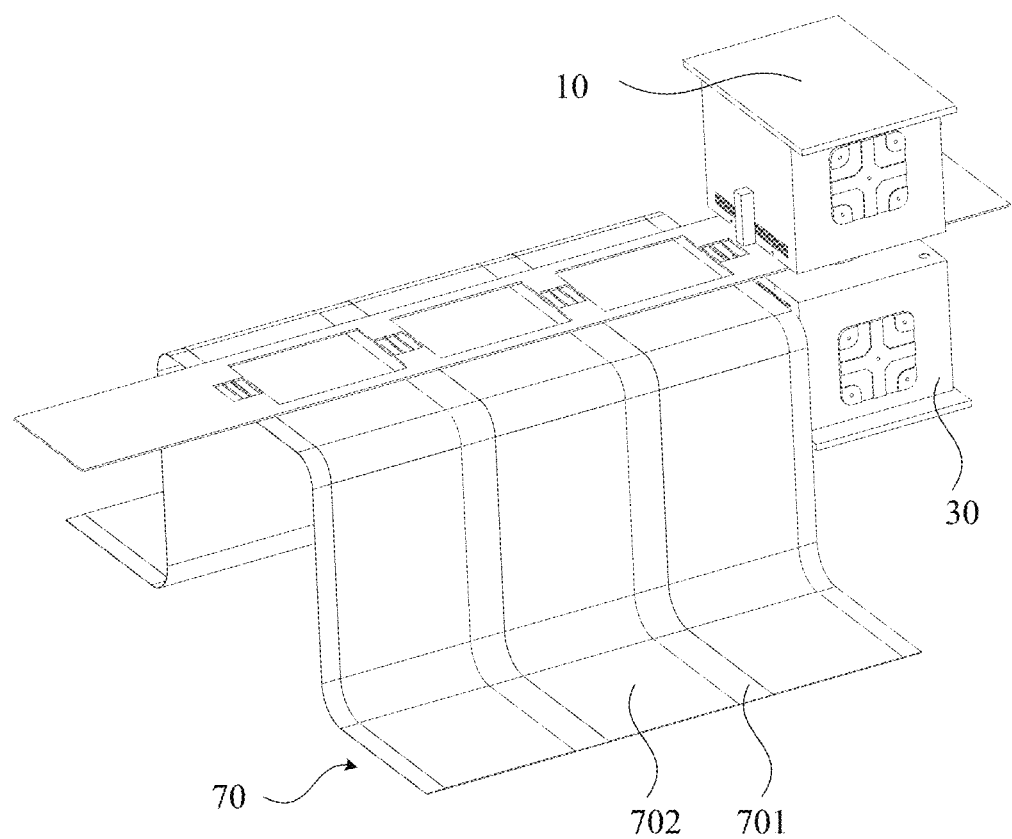
FIG. 3 is a schematic structural diagram of a surface density gauge fitting with an electrode plate according to an embodiment of this application.

FIG. 3 is a schematic structural diagram of a surface density gauge fitting with an electrode plate according to an embodiment of this application. Referring to FIG. 3, the surface density gauge further includes a radioactive source kit 10 and a detector 30. The radioactive source is placed in the radioactive source kit 10. The rays emitted by the radioactive source are detected by the detector 30 after passing through the collimator 1 and the electrode plate. A radiation surface is the radiation surface detected by the detector 30.

In an implementation of the embodiments of this application, the rays emitted by the radioactive source kit 10 are projected onto the electrode plate after passing through the collimator 1.

In another implementation of the embodiments of this application, the detector 30 receives the rays passing through the electrode plate and then the collimator 1.

Figure 4:
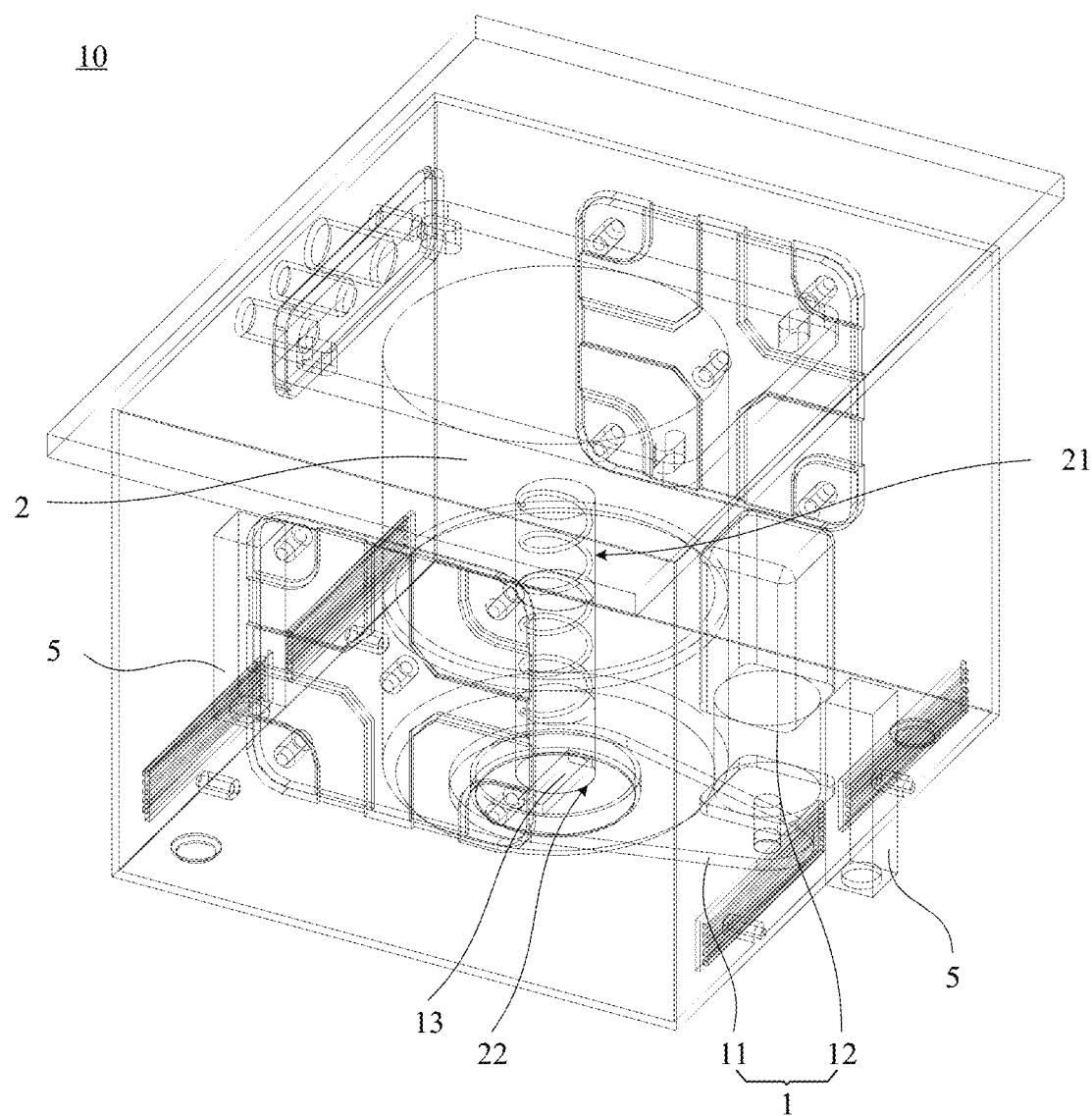
FIG. 4 is a schematic structural diagram of a radioactive source kit fitting with a collimator according to an embodiment of this application.

FIG. 4 is a schematic structural diagram of a radioactive source kit fitting with a collimator according to an embodiment of this application. Referring to FIG. 4, the radioactive source kit 10 includes an accommodating groove 21. The accommodating groove 21 has a predetermined opening 22. The radioactive source is placed in the accommodating groove 21. The rays emitted by the radioactive source are emitted through the predetermined opening 22.

In an implementation of the embodiments of this application, referring to FIG. 4, the collimator 1 is placed at the predetermined opening 22.

Figure 5:
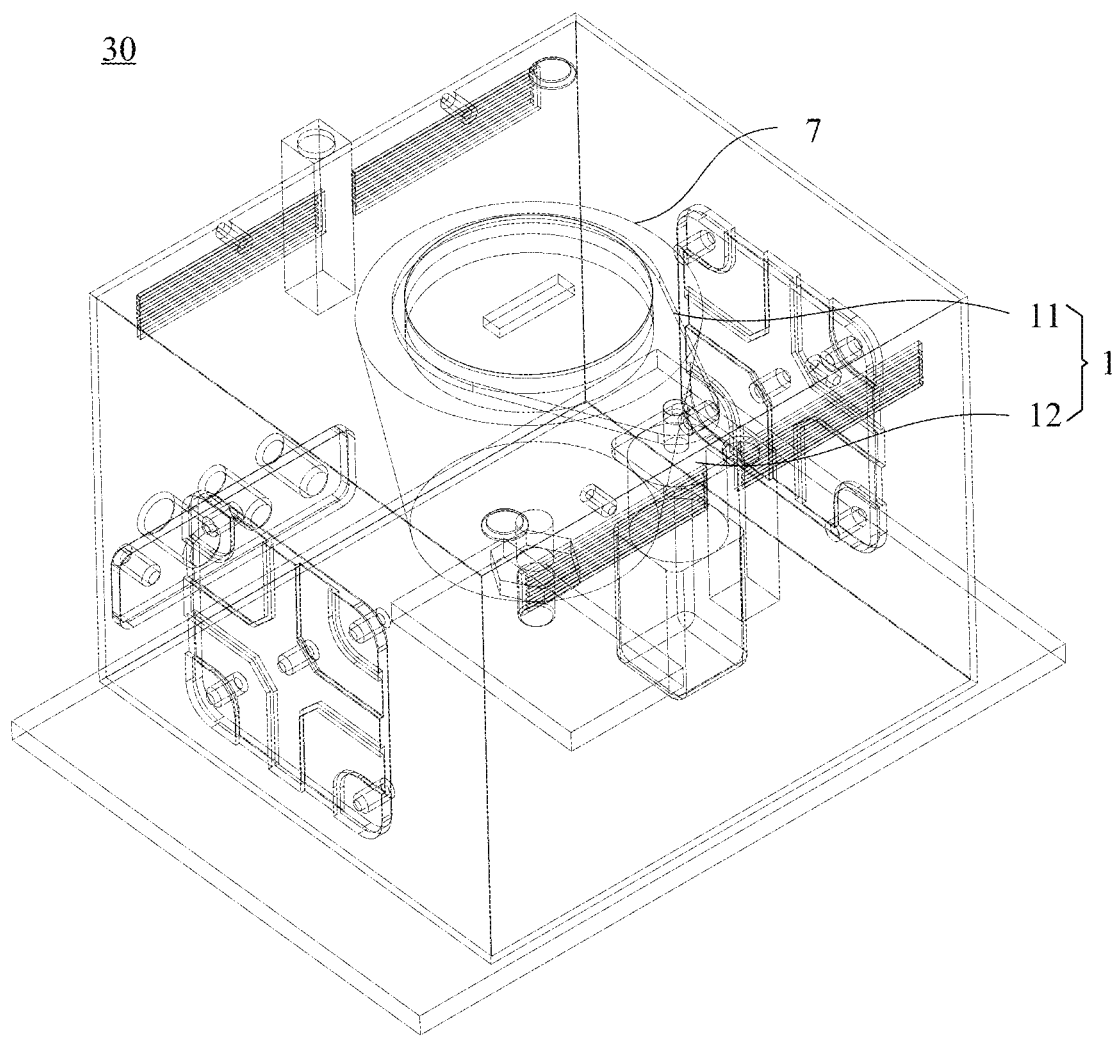
FIG. 5 is a schematic structural diagram of a detector fitting with a collimator according to an embodiment of this application.

According to some embodiments of this application, FIG. 5 is a schematic structural diagram of a detector fitting with a collimator according to an embodiment of this application. Referring to FIG. 5, the detector 30 includes a detection element 7. The collimator 1 is opposite the detection element 7, and the detection element 7 is configured to receive rays passing through the collimator 1.

In other words, when the surface density gauge is used to detect the mass of an electrode plate, the collimator 1 can be placed between the electrode plate and the radioactive source kit 10, or the collimator 1 can be placed between the electrode plate and the detector 30.

According to some embodiments of this application, the radioactive source kit 10 further includes a protective holder 2, where the protective holder 2 has an accommodating groove 21, and the accommodating groove 21 has a predetermined opening 22. The radioactive source is placed in the accommodating groove 21, and the shield plate 11 is located at the predetermined opening 22.

In an implementation of the embodiments of this application, the radioactive source may be an X-ray source.

In another implementation of the embodiments of this application, the radioactive source may be a beta-ray source.

In an implementation of the embodiments of this application, the shield plate 11 shields the predetermined opening 22 to adjust the shapes of the radiation surfaces of the rays emitted by the radioactive source.

In the embodiments of this application, placing the collimator 1 on either the radioactive source kit side or the detector side can achieve the effect of adjusting the shapes of the radiation surfaces.

Referring to FIG. 2, the shield plate 11 is provided with a window 13.

In an embodiment of this application, when the rays emitted by the radioactive source kit 10 of the surface density gauge are projected onto the electrode plate after passing through the collimator 1, step S11 includes:

Step S111: Control the driving mechanism to drive the shield plate to move so that the rays are able to pass through the window and be projected onto the electrode plate.

According to some embodiments of this application, the driving mechanism 12 is configured to drive the shield plate 11 so that the window 13 is aligned with or offset from the predetermined opening 22. The rays emitted by the radioactive source are emitted through the predetermined opening 22 and the window 13 in sequence, or the rays emitted by the radioactive source are emitted through the predetermined opening 22.

For example, when the window 13 is aligned with the predetermined opening 22, the rays emitted by a radioactive source are emitted through the predetermined opening 22 and the window 13 in sequence; and when the window 13 is offset from the predetermined opening 22, the rays emitted by the radioactive source are emitted through the predetermined opening 22.

In the embodiments of this application, when the window 13 is aligned with the predetermined opening 22, the rays emitted by the radioactive source are emitted through the predetermined opening 22 and the window 13 in sequence. In this case, the shapes of the radiation surfaces can be changed by changing the shape of the window 13. In addition, when the window 13 is offset from the predetermined opening 22 and the shield plate 11 does not shield the predetermined opening 22, the rays emitted by the radioactive source are emitted through the predetermined opening 22. In this case, the radiation surface and the predetermined opening 22 have the same shape.

Figure 6:
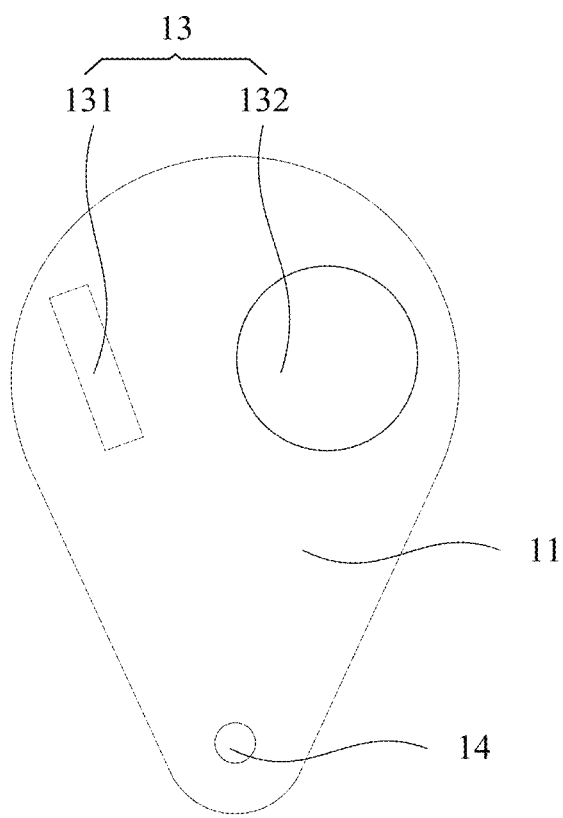
FIG. 6 is a schematic structural diagram of a shield plate according to an embodiment of this application.
Figure 7:
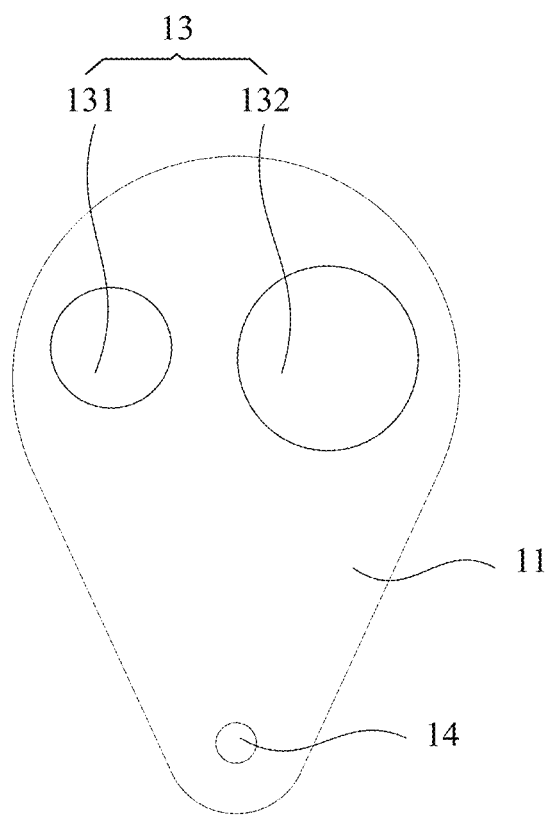
FIG. 7 is a schematic structural diagram of another shield plate according to an embodiment of this application.

According to some embodiments of this application, FIG. 6 is a schematic structural diagram of a shield plate according to an embodiment of this application. FIG. 7 is a schematic structural diagram of another shield plate according to an embodiment of this application. Refer to FIGS. 6 and 7. The shield plate 11 is provided with a plurality of windows 13, the plurality of windows 13 including a first sub-window 131 and a second sub-window 132, and the first sub-window 131 and the second sub-window 132 having different shapes.

In the embodiments of this application, step S111 includes:

Step S1111: Control the driving mechanism to drive the shield plate to move so that the rays are able to pass through either the first sub-window or the second sub-window and be projected onto the electrode plate.

In an implementation of the embodiments of this application, the first sub-window 131 and the second sub-window 132 have different shapes. For example, the first sub-window 131 is rectangular and the second sub-window 132 is circular.

In another implementation of the embodiments of this application, the first sub-window 131 and the second sub-window 132 have the same shape but different sizes. For example, both the first sub-window 131 and the second sub-window 132 are circular, but the diameter of the first sub-window 131 is smaller than the diameter of the second sub-window 132.

In another implementation of the embodiments of this application, the first sub-window 131 and the second sub-window 132 have different sizes, and the first sub-window 131 and the second sub-window 132 have different shapes. For example, the first sub-window 131 is a right-angled trapezoid, the second sub-window 132 is an isosceles trapezoid, and each of the four sides of the right-angled trapezoid is different from any of the four sides of the isosceles trapezoid.

According to some embodiments of this application, the first sub-window 131 and the predetermined opening 22 have different shapes. As a result, radiation surfaces created by the rays emitted by the radioactive source passing through only the predetermined opening 22 and radiation surfaces created by the rays emitted by the radioactive source passing through both the predetermined opening 22 and the first sub-window 131 have different shapes, enabling the collimator 1 to adjust the radiation surfaces of the rays emitted by the radioactive source.

According to some embodiments of this application, in at least one direction, the size of the first sub-window 131 is smaller than the size of the predetermined opening 22. When the size of the first sub-window 131 is smaller than the size of the predetermined opening 22, and the first sub-window 131 and the predetermined opening 22 have different shapes, which makes the size of the radiation surfaces created by the rays emitted by the radioactive source passing through only the predetermined opening 22 smaller than the size of the radiation surfaces created by the rays emitted by the radioactive source passing through both the predetermined opening 22 and the first sub-window 131. As a result, the radiation surfaces created by the rays emitted by the radioactive source passing through only the predetermined opening 22 can be projected onto the coating regions of the electrode plate, and the radiation surfaces created by the rays emitted by the radioactive source passing through both the predetermined opening 22 and the first sub-window 131 can be projected onto the blank regions of the electrode plate, so that a surface density gauge employing the collimator of the embodiments of this application can simultaneously test the coating regions and blank regions of the electrode plate.

According to some embodiments of this application, the second sub-window 132 and the predetermined opening 22 have the same shape, and the second sub-window 132 and the predetermined opening 22 have the same size. In this way, when the driving mechanism 12 drives the second sub-window 132 to be aligned with the predetermined opening 22, the radiation surfaces created by the rays emitted by the radioactive source passing through both the predetermined opening 22 and the second sub-window 132 are the same as the radiation surfaces created by the rays emitted by the radioactive source passing through only the predetermined opening 22. Thus, the radiation surfaces can be adjusted by adjusting the alignment of the first sub-window 131 and the second sub-window 132 with the predetermined opening 22.

In an implementation of the embodiments of this application, the shield plate 11 covers the predetermined opening 22, the first sub-window 131 and the second sub-window 132 are distributed along a circumferential direction A of the shield plate 11, and the shield plate 11 is configured to be rotatable such that one of the first sub-window 131 and the second sub-window 132 is aligned with the predetermined opening 22. The shield plate 11 has a rotating center 14, and the shield plate 11 rotates around the rotating center 14. In FIG. 6 and FIG. 7, the shield plate 11 has an irregular shape, and the windows 13 and the rotating center 14 are located on two ends of the shield plate 11 respectively. In other implementations, the shield plate 11 may be a circle, the windows 13 are arranged around the circumference of the shield plate 11, and the rotating center 14 is located at the center of the circle.

In the embodiments of this application, the driving mechanism 12 can control the shield plate 11 to rotate around the rotating center 14, such that one of the first sub-window 131 and the second sub-window 132 is aligned with the predetermined opening 22, so as to adjust the shapes of the radiation surfaces.

In another implementation of the embodiments of this application, the first sub-window 131 and the second sub-window 132 are distributed along a predetermined direction, and the shield plate 11 is configured to be movable linearly along the predetermined direction such that one of the first sub-window 131 and the second sub-window 132 is aligned with the predetermined opening 22.

In the embodiments of this application, the driving mechanism 12 can control the shield plate 11 to be movable linearly along the predetermined direction, such that one of the first sub-window 131 and the second sub-window 132 is aligned with the predetermined opening 22, so as to adjust the shapes of the radiation surfaces.

In the embodiments of this application, the shield plate 11 is provided with two windows, that is, the first sub-window 131 and the second sub-window 132. The radiation surfaces of the radioactive source on the electrode plate can be adjusted by adjusting the position alignment of the first sub-window 131 or the second sub-window 132 with the predetermined opening 22, so as to realize the adjustment of the shapes of the radiation surfaces.

The shape and number of windows 13 shown in FIGS. 6 and 7 are only an example. In other implementations, the windows 13 may have other shapes, and the shield plate 11 may include a greater number of windows 13.

According to some embodiments of this application, step S11 includes:

Step S112: Control the driving mechanism to drive the shield plate to move so as to adjust a shielding area of the shield plate against rays projected to the collimator in an optical axis direction of the surface density gauge.

Figure 8:
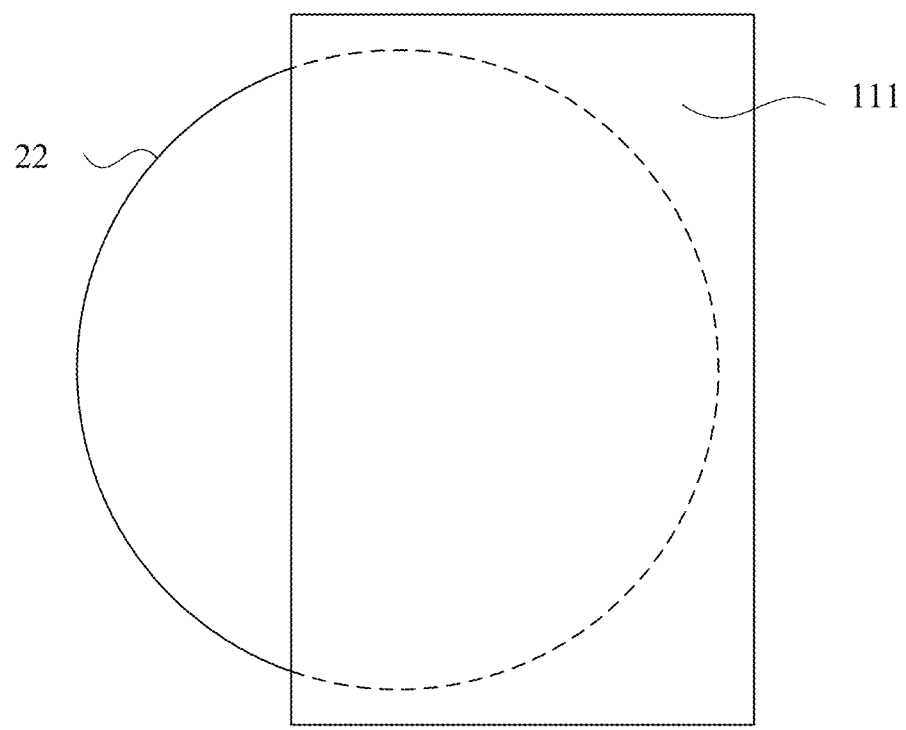
FIG. 8 is a diagram of a shield plate fitting with a predetermined opening according to some embodiments of this application.

In an implementation of the embodiments of this application, FIG. 8 is a diagram of a shield plate fitting with a predetermined opening according to some embodiments of this application. Referring to FIG. 8, only one shield plate 11 is provided. The shield plate 11 covers the predetermined opening 22, and the shapes of the radiation surfaces can be adjusted by adjusting the shielding of the predetermined opening 22 by the shield plate 11.

Figure 9:
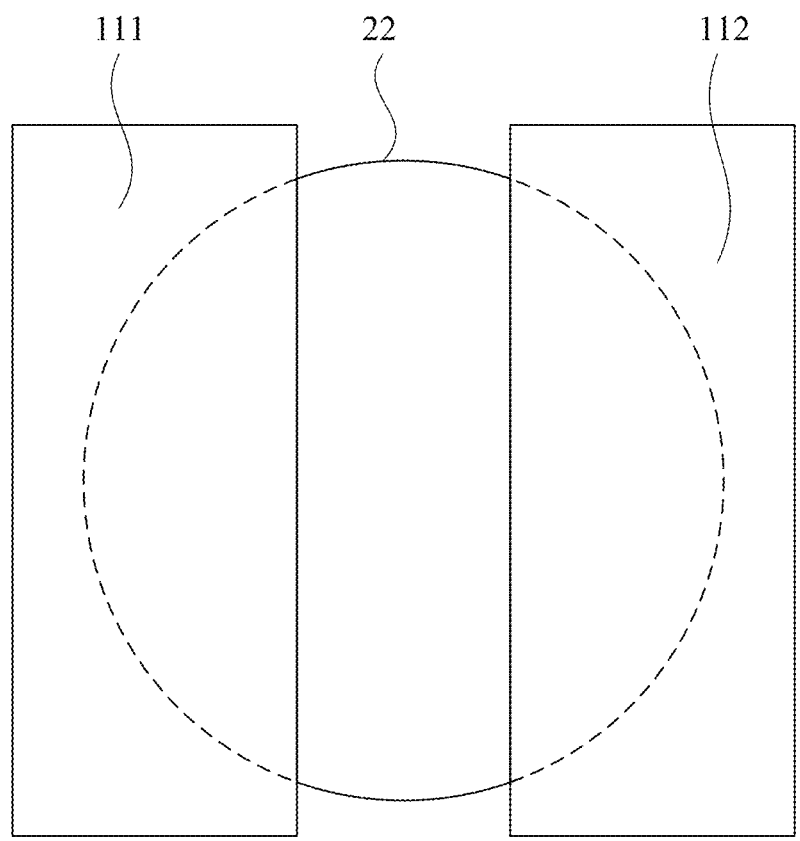
FIG. 9 is a diagram of a shield plate fitting with a predetermined opening according to some embodiments of this application.

In another implementation of the embodiments of this application, FIG. 9 is a diagram of a shield plate fitting with a predetermined opening according to some embodiments of this application. Referring to FIG. 9, the shield plate 11 includes a first sub-shield plate 111 and a second sub-shield plate 112, and the driving mechanism 12 is configured to drive the first sub-shield plate 111 and the second sub-shield plate 112 to approach or leave each other so as to adjust the shielding area of the first sub-shield plate 111 and the second sub-shield plate 112 with respect to the predetermined opening 22 in a direction perpendicular to the optical axis of the radioactive source.

In other implementations, the shield plate 11 may include a greater number of sub-shield plates.

In the embodiments of this application, the shielding area of the shield plate 11 with respect to the ray outlet can be adjusted to adjust the shapes of the radiation surfaces.

Figure 10:
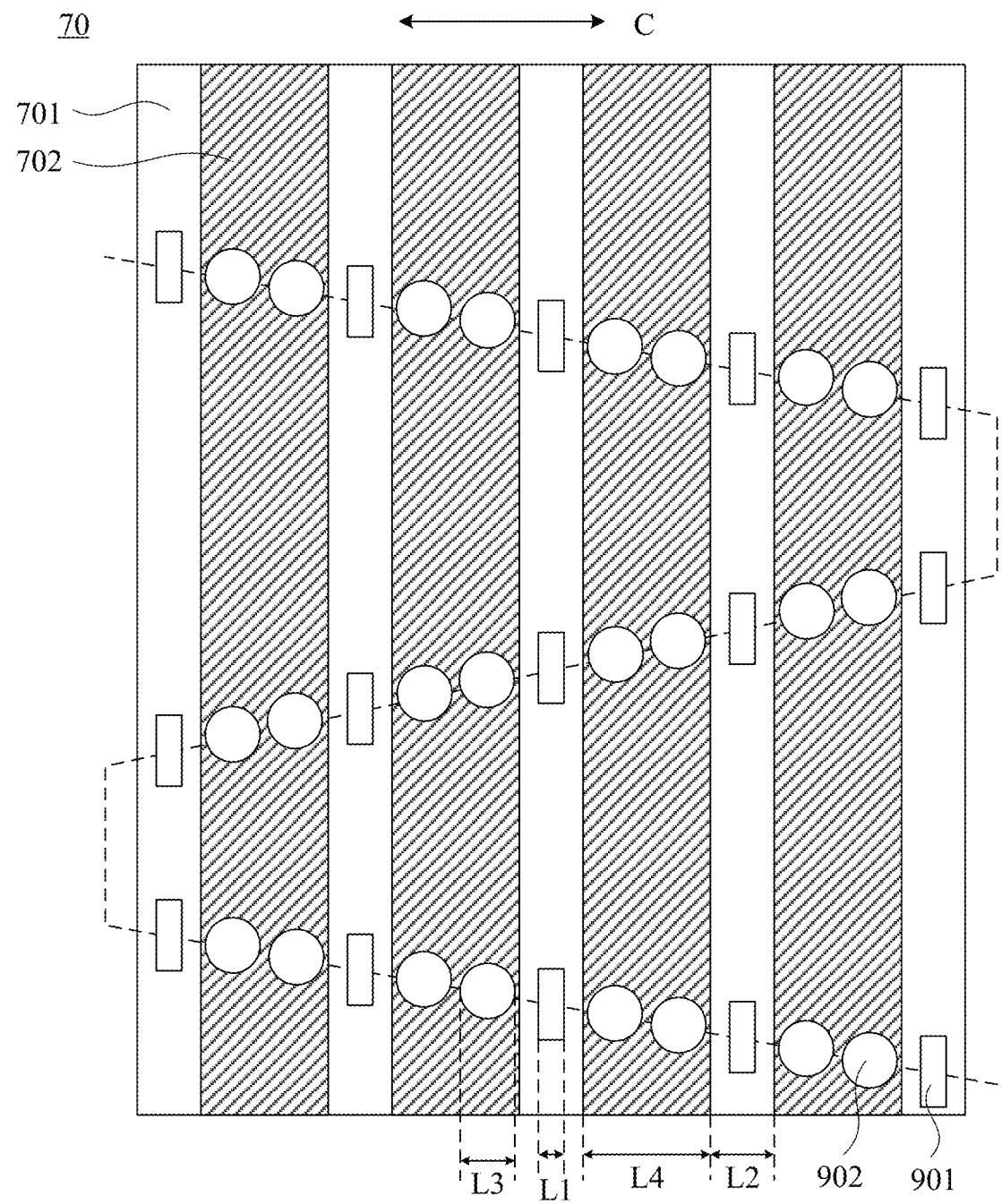
FIG. 10 is a top view of an electrode plate according to some embodiments of this application.
Figure 11:
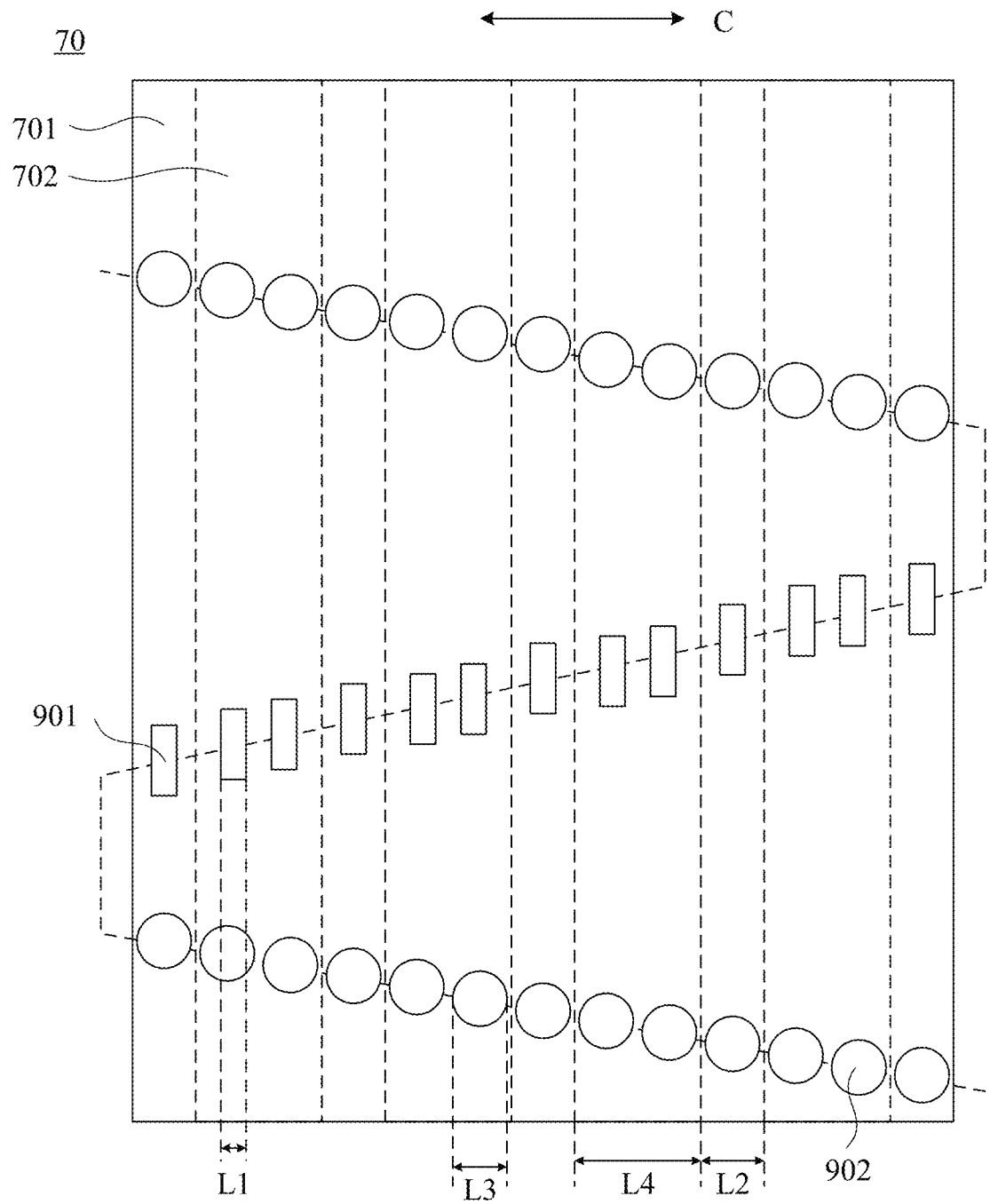
FIG. 11 is a top view of an electrode plate according to some embodiments of this application.

According to some embodiments of this application, FIG. 10 is a top view of an electrode plate according to some embodiments of this application. FIG. 11 is a top view of an electrode plate according to some embodiments of this application. The electrode plate in FIG. 10 is coated with slurry and the electrode plate in FIG. 11 is uncoated with slurry. Referring to FIGS. 10 and 11, the electrode plate 70 includes a plurality of blank regions 701 and at least one coating region 702 arranged along a width direction C of the electrode plate 70, the coating region(s) 702 and the blank regions 701 are arranged alternately, and the surface density gauge is configured to scan the electrode plate 70 along the width direction C of the electrode plate 70 and create radiation surfaces on the electrode plate 70 during the scanning.

According to some embodiments of this application, step S10 includes:

Step S12: During scanning of the electrode plate by the surface density gauge, control the surface density gauge to create a first radiation surface in the blank region of the electrode plate and a second radiation surface in the coating region of the electrode plate.

In an embodiment of this application, in the width direction C of the electrode plate 70, width L1 of the first radiation surface 901 is smaller than width L2 of the blank region 701, and width L3 of the second radiation surface 902 is smaller than width L4 of the coating region 702.

For example, in the width direction C of the electrode plate 70, width L1 of the first radiation surface 901 is smaller than width L2 of any one of the blank regions 701 of the electrode plate 70, and width L3 of the second radiation surface 902 is smaller than width L4 of any one of the coating region(s) 702 of the electrode plate 70 and larger than the width L2 of any one of the blank regions 701 of the electrode plate 70.

For example, the width L2 of the blank region 701 is greater than or equal to 15 millimeters and less than or equal to 50 millimeters. The width L4 of the coating region 702 is greater than or equal to 100 millimeters and less than or equal to 500 millimeters.

In the embodiments of this application, the surface density gauge scans the electrode plate 70 back and forth along the width direction C of the electrode plate 70 to leave a plurality of second radiation surfaces 902 in the coating region 702 of the electrode plate 70, and calculates the mass of slurry on the electrode plate corresponding to each second radiation surface 902 in the coating region 702. Then, the mass of coating can be determined based on the change in the mass of slurry on the electrode plate corresponding to the second radiation surfaces 902.

In the embodiments of this application, when the electrode plate mass detection apparatus tests the electrode plate 70 back and forth along the width direction C of the electrode plate 70, the electrode plate 70 moves along a length direction, so the scanning track displayed is "S".

In the embodiments of this application, the width L1 of the first radiation surface 901 is smaller than the width L2 of any one of the blank regions 701 of the electrode plate 70, ensuring that the first radiation surface 901 can completely fall within the blank region 701, preventing the first radiation surface 901 from falling to the coating region 702 and affecting the detection result. The width L3 of the second radiation surface 902 is smaller than the width L4 of any one of the coating regions 702 of the electrode plate 70 and larger than the width L2 of any one of the blank regions 701 of the electrode plate 70, such that the second radiation surface 902 can completely fall within the coating region 702, ensuring that the second radiation surface 902 is large enough while the coating region 702 is being tested. A larger area means greater precision, improving the accuracy of the detection result.

According to some embodiments of this application, during one scan of the electrode plate by the surface density gauge, the first radiation surface and the second radiation surface have different shapes.

Because the blank regions 701 and the coating regions 702 are arranged along the width direction C of the electrode plate 70, the surface density gauge would pass through both the blank regions 701 and the coating regions 702 during one scan.

In the embodiments of this application, during scanning, the first radiation surface 901 or the second radiation surface 902 is adjusted depending to different regions of the electrode plate, allowing for simultaneous testing of the blank regions 701 and the coating regions 702 in one scan.

According to some embodiments of this application, during one scan of the electrode plate by the surface density gauge, the first radiation surface and the second radiation surface have a same shape. During two consecutive scans of the electrode plate by the surface density gauge, the first radiation surface and the second radiation surface have different shapes.

In the embodiments of this application, during scanning, radiation surfaces of one shape can be created in one scan and radiation surfaces of another shape can be created in the next scan, allowing for the testing of both the blank regions 701 and the coating regions 702 of the electrode plate 70. In addition, during one scan, creating both first radiation surfaces and second radiation surfaces can also enable the testing of both the blank regions 701 and the coating regions 702 of the electrode plate 70.

According to some embodiments of this application, referring to FIG. 4, the surface density gauge further includes a position detector 5.

According to some embodiments of this application, FIG. 12 is a flowchart of an electrode plate mass detection method according to some embodiments of this application. Referring to FIG. 12, step S11 includes:

Step S113: During scanning of the electrode plate by the surface density gauge, control the position detector to detect position information of the surface density gauge relative to the electrode plate.

Step S114: Based on the position information, control the driving mechanism of the collimator to drive the shield plate to move.

In the embodiments of this application, the position detector 5 located on at least one side of the protective holder 2, the position detector 5 is in communication connection with the driving mechanism 12, and the position detector 5 is configured to detect a position of the radioactive source kit 10 and generate a detection result based on the position of the radioactive source kit 10. The driving mechanism 12 is configured to perform, based on the detection result of the position detector 5, an operation of driving the collimator 1 to adjust the shapes of radiation surfaces of rays emitted by the radioactive source.

In an implementation of the embodiments of this application, the coating region and the blank region on the electrode plate have different colors, and the position detector 5 can determine the position of the radioactive source kit 10 based on the detected color.

For example, the position detector 5 may be a fiber optic position detector.

In another implementation of the embodiments of this application, a reference object may be provided, and a distance between the radioactive source and the reference object is detected to determine the position of the radioactive source kit 10.

In the embodiments of this application, the position detector 5 is configured to detect the position of the radioactive source kit 10 and generate the detection result based on the position of the radioactive source, and the driving mechanism 12 performs, based on the detection result of the position detector 5, the operation of driving the collimator 1 to adjust the shapes of the radiation surfaces of the rays emitted by the radioactive source. In this way, the shapes of the radiation surfaces can be automatically adjusted based on the position detected by the position detector 5, achieving automatic adjustment and greater convenience.

According to some embodiments of this application, the radioactive source kit 10 includes two position detectors 5, the two position detectors 5 being located on two opposite sides of the protective holder 2, respectively.

In the embodiments of this application, the two position detectors 5 are located on two sides of the radioactive source kit 10 in the movement direction.

In the embodiments of this application, the two position detectors 5 may both detect the position of the radioactive source, or one of the two position detectors 5 detects the position of the radioactive source.

For example, the radioactive source kit 10 moves leftward and rightward, and the two position detectors 5 are located on left and right sides of the radioactive source kit 10, respectively. When the radioactive source kit 10 moves leftward, the position detector 5 located on the left side of the radioactive source kit 10 detects that the position detector 5 is opposite the blank region. Because the radioactive source is located on the right side of the left position detector 5, it means that the radioactive source is about to move to a position opposite the blank region. Thus, the driving mechanism 12 can be used to drive the shield plate 11 to move such that the first sub-window 131 on the shield plate 11 is opposite the predetermined opening 22, so that when the radioactive source moves to the position opposite the blank region, a radiation surface matching the size of the blank region can be created in the blank region. Similarly, when the radioactive source kit 10 moves rightward, the position detector 5 located on the right side of the radioactive source kit 10 is configured to detect the position information, and the specific adjustment process is not described herein again.

In the embodiments of this application, it takes a certain time to adjust the shield plate 11, so the position of the position detector 5 can be determined first based on the position information detected by the position detector 5 and the position to which the radioactive source is about to move is determined based on the position information of the position detector 5. Then the shield plate 11 is adjusted, such that the radioactive source can create a radiation surface of a corresponding shape on the object under test when moving to a corresponding test region. The surface density gauge scans the electrode plate back and forth during use, and the two position detectors 5 are arranged on two sides of the radioactive source kit 10 in the movement direction. During the process of scanning back and forth, the detection region to which the radioactive source is about to move can be determined in advance based on the position information detected by one of the two position detectors 5, and automatic adjustment and greater convenience can be achieved during the process of scanning back and forth.

According to some embodiments of this application, FIG. 13 is a flowchart of an electrode plate mass detection method according to some embodiments of this application. Referring to FIG. 13, step S30 includes:

Step S31: Obtain a mass relationship coefficient between the coating region of the electrode plate and the blank region of the electrode plate.

Step S32: Determine mass information of the electrode plate based on the surface density information and the mass relationship coefficient.

In the embodiments of this application, the mass relationship coefficient between the coating region of the electrode plate and the blank region of the electrode plate refers to a ratio of the mass of electrode plate corresponding to the radiation surface created on the coating region and the mass of electrode plate corresponding to the radiation surface created in the blank region, determined when the electrode plate is uncoated with slurry. It should be understood that the mass relationship coefficient between the coating region of the electrode plate and the blank region of the electrode plate may alternatively refer to a ratio of the mass of electrode plate corresponding to the radiation surface created in the coating region and the mass of electrode plate corresponding to the radiation surface created in the blank region, determined when a first surface of the electrode plate is coated with slurry and a second surface of the electrode plate is uncoated with slurry.

In the embodiments of this application, the masses of electrode plate corresponding to different radiation surfaces can be determined based on the surface density information. For an electrode plate coated with slurry, mass of the electrode plate includes the mass of foil and the mass of slurry. The mass of foil can be determined based on the mass relationship coefficient. The mass of slurry can be determined based on the masses of electrode plate and the mass of foil, and thereby, the mass of the electrode plate can be determined.

According to some embodiments of this application, the surface density gauge includes a first surface density gauge, the mass information includes mass of slurry applied onto a first surface of the electrode plate, and the mass relationship coefficient is a mass relationship coefficient between the coating region of the electrode plate and the blank region of the electrode plate determined when the first surface of the electrode plate is uncoated with slurry.

Figure 14:
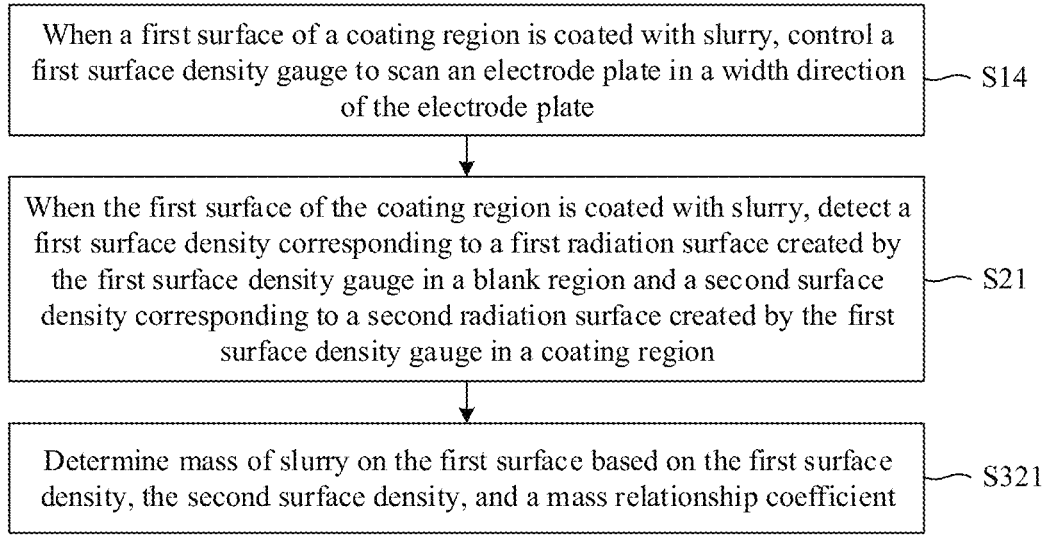
FIG. 14 is a flowchart of an electrode plate mass detection method according to some embodiments of this application.

According to some embodiments of this application, FIG. 14 is a flowchart of an electrode plate mass detection method according to some embodiments of this application. Referring to FIGS. 1, 13, and 14, step S10 includes:

Step S14: When a first surface of the coating region is coated with slurry, control the first surface density gauge to scan the electrode plate along the width direction of the electrode plate.

Step S20 includes:

Step S21: When the first surface of the coating region is coated with slurry, detect a first surface density corresponding to a first radiation surface created by the first surface density gauge in the blank region and a second surface density corresponding to a second radiation surface created by the first surface density gauge in the coating region.

Step S32 includes:

Step S321: Determine mass of slurry on the first surface based on the first surface density, the second surface density, and the mass relationship coefficient.

In the embodiments of this application, the first surface density gauge scans back and forth along the width direction C of the electrode plate, leaving a plurality of radiation surfaces on the electrode plate. The first surface density is a first surface density corresponding to the first radiation surface created by the first surface density gauge in the blank region. In this case, the first surface density is related only to the foil and not to the slurry. After slurry is applied on the coating region of the electrode plate, the second surface density is a second surface density corresponding to the second radiation surface created in the coating region. In this case, the second surface density is related to both the foil and the slurry.

In the embodiments of this application, assuming that the mass relationship coefficient is K, the area of the first radiation surface is S1, the area of the second radiation surface is S2, and for an electrode plate coated with slurry on the first surface of the coating region, the first surface density gauge detects the first surface density of the blank region as P1, and the second surface density of the coating region as P2, then the mass of the blank region where the first radiation surface is located is P1×S1, and the mass of the coating region where the second radiation surface is located is P2×S2. Through the mass relationship coefficient K, the mass of foil in the coating region where the second radiation surface is located can be calculated as K×P1×S1, and then the mass of slurry in the coating region where the second radiation surface is located is P2×S2−K×P1×S1. That is, the mass of foil in the coating region can be easily determined based on the mass relationship coefficient. Then, the mass of slurry can be determined based on the mass of foil.

Figure 15:
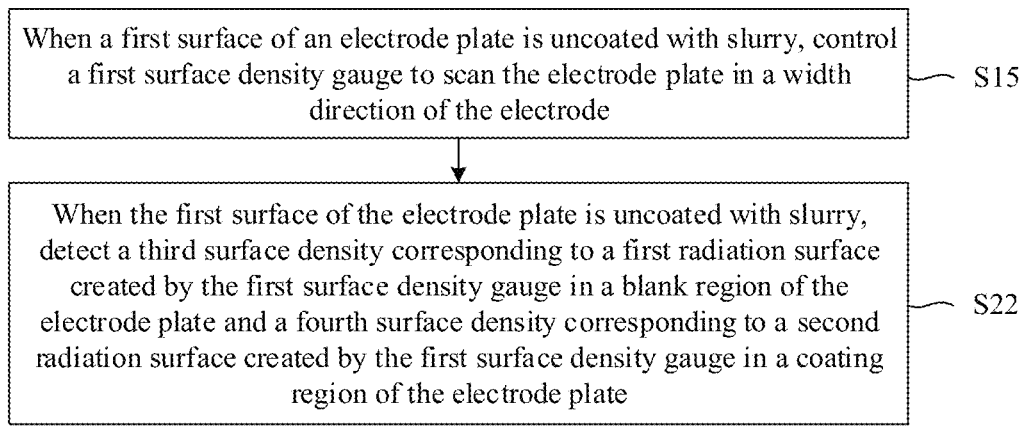
FIG. 15 is a flowchart of an electrode plate mass detection method according to some embodiments of this application.

According to some embodiments of this application, FIG. 15 is a flowchart of an electrode plate mass detection method according to some embodiments of this application. Referring to FIGS. 1, and 15, step S10 includes:

Step S15: When the first surface of the electrode plate is uncoated with slurry, control the first surface density gauge to scan the electrode plate along the width direction of the electrode.

Step S20 includes:

Step S22: When the first surface of the electrode plate is uncoated with slurry, detect a third surface density corresponding to the first radiation surface created by the first surface density gauge in the blank region of the electrode plate and a fourth surface density corresponding to the second radiation surface created by the first surface density gauge in the coating region of the electrode plate.

The mass relationship coefficient is determined based on area of the first radiation surface, area of the second radiation surface, the third surface density, and the fourth surface density detected when the first surface of the electrode plate is uncoated with slurry.

In the embodiments of this application, when the first surface density gauge scans the electrode plate, a plurality of first radiation surfaces and a plurality of second radiation surfaces can be created on the electrode plate, and the surface density of each of the first radiation surfaces and the surface density of each of the second radiation surfaces are detected. Then, the third surface density corresponding to the first radiation surface is determined based on an average of the surface densities of the plurality of first radiation surfaces, and the fourth surface density corresponding to the second radiation surface is determined based on an average of the surface densities of the plurality of second radiation surfaces. This helps to reduce the influence of random errors.

In the embodiments of this application, assuming that the third surface density is P3 and the fourth surface density is P4, when the first surface of the electrode plate is uncoated with slurry, the mass of electrode plate corresponding to the first radiation surface can be determined as P3×S1 and the mass of electrode plate corresponding to the second radiation surface can be determined as P4×S2, then the mass relationship coefficient K can be determined as K=(P4×S2)/(P3×S1).

According to the foregoing method, it is easy to determine the mass of electrode plate corresponding to the first radiation surface and the mass of electrode plate corresponding to the second radiation surface when the first surface of the electrode plate is not applied with slurry, and thus determine the mass relationship coefficient.

According to some embodiments of this application, the mass relationship coefficient includes a mass relationship sub-coefficient between each coating region of the electrode plate and the blank region of the electrode plate adjacent to the coating region, determined when the first surface of the electrode plate is uncoated with slurry. Step S33 includes:

Step S331: Determine the mass of slurry on the first surface based on the first surface density, the second surface density, and the mass relationship sub-coefficient corresponding to the at least one coating region.

According to some embodiments of this application, each coating region is located close to a blank region adjacent to the coating region, and the foil experiences minimal fluctuations in the connected positions, resulting in significant differences in surface density. This allows for a more accurate mass relationship sub-coefficient between each coating region of the electrode plate and the blank region of the electrode plate adjacent to the coating region. As a result, the calculated mass is more accurate.

According to some embodiments of this application, during one scan of the electrode plate by the first surface density gauge, the first radiation surface and the second radiation surface have different shapes; alternatively, during one scan of the electrode plate by the first surface density gauge, the first radiation surface and the second radiation surface have a same shape, and during two consecutive scans of the electrode plate by the surface density gauge, the first radiation surface and the second radiation surface have different shapes.

In the embodiments of this application, during scanning, radiation surfaces of one shape can be created in one scan and radiation surfaces of another shape can be created in the next scan, allowing for the testing of both the blank regions 701 and the coating regions 702 of the electrode plate 70. Similarly, during one scan, creating both first radiation surfaces and second radiation surfaces can also enable the testing of both the blank regions 701 and the coating regions 702 of the electrode plate 70.

According to some embodiments of this application, the surface density gauge further includes a second surface density gauge, and the mass information further includes mass of slurry applied onto a second surface of the electrode plate, the first surface and the second surface being two opposite surfaces of the electrode plate.

Figure 16:
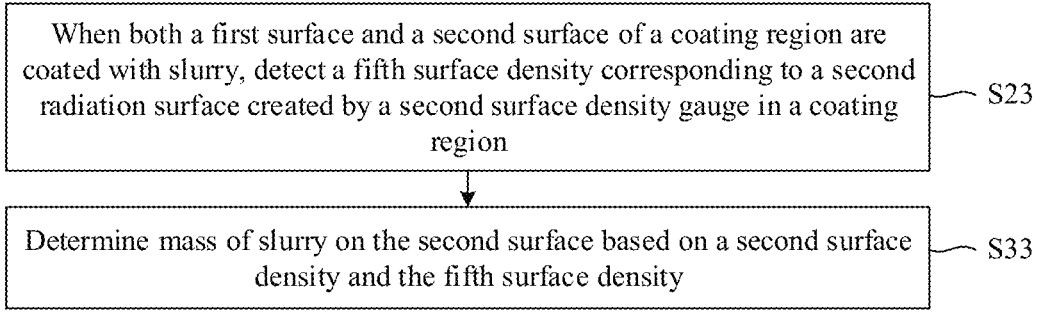
FIG. 16 is a flowchart of an electrode plate mass detection method according to some embodiments of this application.

FIG. 16 is a flowchart of an electrode plate mass detection method according to some embodiments of this application. Referring to FIGS. 1 and 16, step S10 further includes:

Step S16: When both the first surface and the second surface of the coating region are coated with slurry, control the second surface density gauge to scan the electrode plate along the width direction of the electrode plate.

Step S20 further includes:

Step S23: When both the first surface and the second surface of the coating region are coated with slurry, detect a fifth surface density corresponding to the second radiation surface created by the second surface density gauge in the coating region. Step S30 includes:

Step S33: Determine the mass of slurry on the second surface based on the second surface density and the fifth surface density.

In an implementation of the embodiments of this application, when the second surface density gauge scans the electrode plate along the width direction C of the electrode plate, a second radiation surface is created in the coating region of the electrode plate.

In an implementation of the embodiments of this application, when the second surface density gauge scans the electrode plate along the width direction C of the electrode plate, a first radiation surface is created in the blank region of the electrode plate and a second radiation surface is created in the coating region of the electrode plate.

In the embodiments of this application, assuming that the fifth surface density corresponding to the second radiation surface is P5, then when both the first surface and the second surface of the coating region are coated with slurry, the mass of electrode plate corresponding to the second radiation surface is P5×S2, which includes the mass of foil, the mass of slurry on the first surface, and the mass of slurry on the second surface. The sum of the mass of foil and the mass of slurry on the first surface is P2×S2, so the mass of slurry on the second surface is P5×S2-P2×S2.

According to the foregoing method, it is easy to determine the mass of electrode plate corresponding to the second radiation surface in the coating region when both the first surface and the second surface of the coating region are coated with slurry, and thereby the mass of slurry on the second surface can be determined.

The method provided in embodiments of this application can realize detection of the mass of the electrode plate using two surface density gauges. Compared with the related art that requires three surface density gauges for mass detection, this method offers a simpler structure at lower operating costs.

In the embodiments of this application, after slurry is applied onto the first surface, a mass relationship coefficient between the coating region of the electrode plate and the blank region of the electrode plate can be determined, and then the mass relationship coefficient can be used to calculate the mass of slurry applied onto the second surface.

According to some embodiments of this application, during one scan of the electrode plate by the second surface density gauge, the second radiation surface varies in shape; or, during one scan of the electrode plate by the second surface density gauge, the second radiation surface maintains a consistent shape, and during two consecutive scans of the electrode plate by the surface density gauge, the second radiation surface varies in shape.

In the embodiment of this application, during scanning, radiation surfaces of one shape can be created in one scan and radiation surfaces of another shape can be created in the next scan, allowing for the testing of both the blank regions 701 and the coating regions 702 of the electrode plate 70. Similarly, during one scan, creating second radiation surfaces of different shapes can also enable the testing of both the blank regions 701 and the coating regions 702 of the electrode plate 70.

According to some embodiments of this application, scanning tracks of the first surface density gauge and the second surface density gauge on the electrode plate include a plurality of test points, and the rays emitted by the first surface density gauge and the second surface density gauge are projected onto the electrode plate at each of the test points. Positions of a plurality of radiation surfaces created by the first surface density gauge on the electrode plate during one scan correspond one-to-one to positions of a plurality of radiation surfaces created by the second surface density gauge on the electrode plate during one scan.

In the embodiments of this application, because the second radiation surfaces 902 created on the electrode plate 70 by the first surface density gauge 601 and the second radiation surfaces 902 created on the electrode plate 70 by the second surface density gauge 602 have the same positions and shape, testing at same points is achieved, allowing for higher accuracy.

According to some embodiments of this application, the first radiation surface is a rectangle, and the second radiation surface is a circle, with length of a side of the rectangle in the width direction C of the electrode plate smaller than diameter of the circle.

The first radiation surface is located in the blank region 701, while the second radiation surface is located in the coating region 702. The blank region 701 has a smaller width. By setting the first radiation surface to the shape of a rectangle, the width of the rectangle can be adjusted to ensure that the first radiation surface completely falls within the blank region. The coating region has a larger width and the circular shape has a larger size, allowing for more accurate detection of the surface density.

According to some embodiments of this application, the rectangle and the circle satisfy at least one of the following conditions: the width of the rectangle is greater than or equal to 5 millimeters and less than or equal to 20 millimeters, and the diameter of the circle is greater than or equal to 10 millimeters and less than or equal to 40 millimeters.

Limiting the width of the rectangle allows the size of the first radiation surface to fit into the blank region, and limiting the size of the circle allows the size of the second radiation surface to fit into the coating region.

According to some embodiments of this application, the electrode plate further includes thinned regions, and along the width direction C of the electrode plate, the thinned regions are located on two sides of the coating region and between the blank region and the coating region; and when the surface density gauge includes a collimator, step S11 includes:

Step S113: In the thinned regions, control the driving mechanism to drive the shield plate to move so as to adjust the surface density gauge to create a first radiation surface in the blank region of the electrode plate and a second radiation surface in the coating region.

In the embodiments of this application, the switching needs to occur in the thinned regions to avoid affecting the detection accuracy for the coating region.

In the embodiments of this application, assuming that the width of the thinned region is D and the scanning speed of the surface density gauge is V, and assuming that the shield plate rotates to realize the adjustment of the window, and the driving mechanism is controlled to drive the shield plate to rotate $\theta$ so as to make the window aligned with of the predetermined opening in position, then the switching time T=D/V, and based on the switching time T and the rotation angle $\theta$, the angular speed of the rotation of the driving mechanism 12 is determined as $\theta V/D$.

In an implementation of the embodiments of this application, the scanning speed V of the surface density gauge is greater than or equal to 6 meters per minute (m/min) and less than or equal to 18 m/min.

Figure 17:
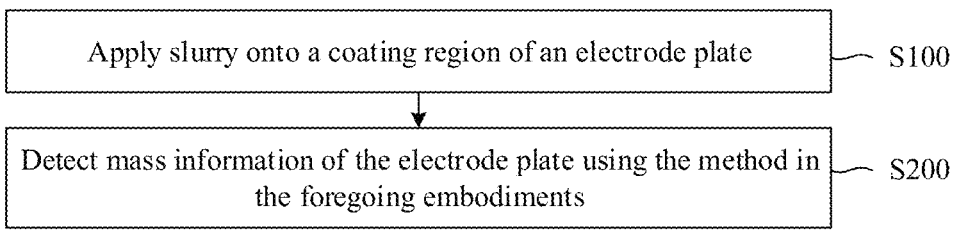
FIG. 17 is a flowchart of an electrode plate production method according to some embodiments of this application.

This application further provides an electrode plate production method. FIG. 17 is a flowchart of an electrode plate production method according to some embodiments of this application. Referring to FIG. 17, the method includes:

Step S100: Apply slurry onto a coating region of an electrode plate.

Step S200: Detect mass information of the electrode plate using the method in the foregoing embodiments.

In the embodiments of this application, after slurry is applied onto the electrode plate, mass information of the electrode plate can be detected using the method in the foregoing embodiments. Then, based on the mass information of the electrode plate, the mass of coating can be determined.

Figure 18:
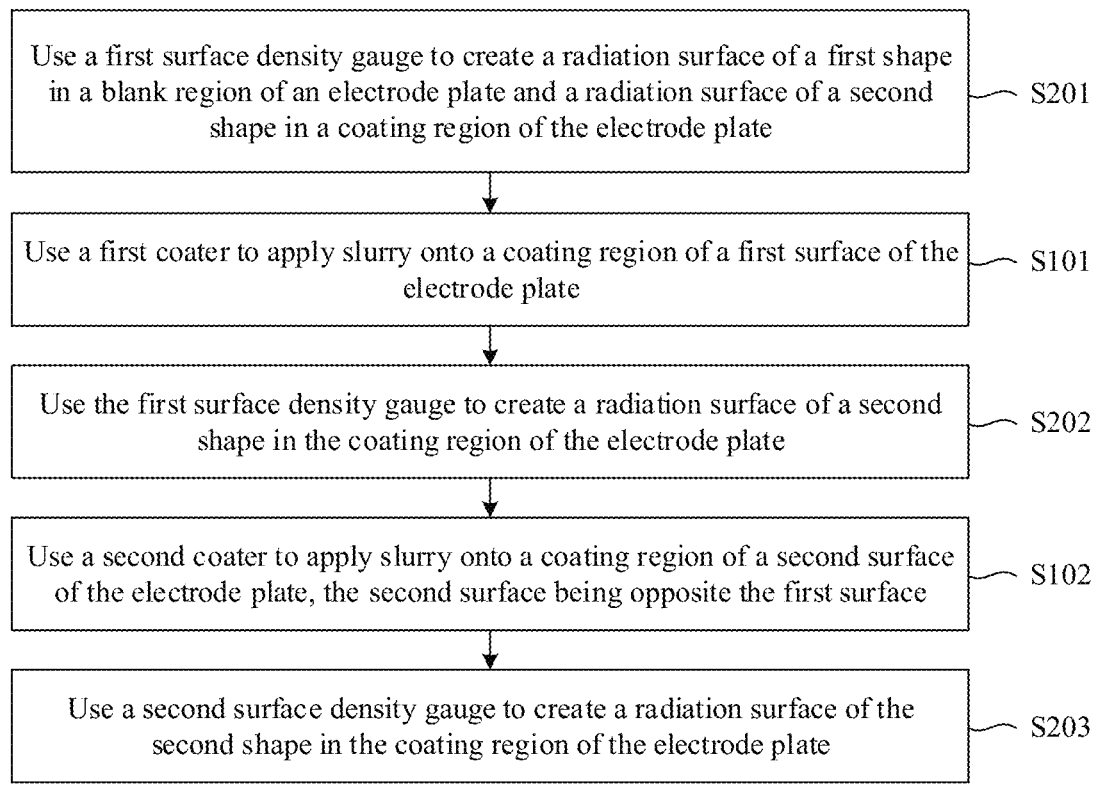
FIG. 18 is a flowchart of an electrode plate production method according to some embodiments of this application.

According to some embodiments of this application, the surface density gauge includes a first surface density gauge positioned after the first coater and a second surface density gauge positioned after the second coater. FIG. 18 is a flowchart of an electrode plate production method according to some embodiments of this application. Referring to FIG. 18, the method includes:

Step S201: Use the first surface density gauge to create a radiation surface of a first shape in the blank region of the electrode plate, and a radiation surface of a second shape in the coating region of the electrode plate.

Step S101: Use a first coater to apply slurry onto a coating region of a first surface of the electrode plate.

Step S202: Use the first surface density gauge to create a radiation surface of a second shape in the coating region of the electrode plate.

Step S102: Use a second coater to apply slurry onto a coating region of a second surface of the electrode plate, the second surface being opposite the first surface.

Step S203: Use the second surface density gauge to create a radiation surface of the second shape in the coating region of the electrode plate.

According to some embodiments of this application, step S100 includes steps S101 and S102, and step S200 includes steps S201, S202, and S203.

In an embodiment of this application, the first shape is different from the second shape.

For example, the first shape is the same as the shape of the first radiation surface, and the second shape is the same as the shape of the second radiation surface.

In the embodiments of this application, according to the foregoing method, the shapes of radiation surfaces can be adjusted according to different positions of the electrode plate, so that the shapes of the radiation surfaces are more suitable for the electrode plate, and the surface density information obtained according to the radiation surfaces is more accurate, so that the mass information of the electrode plate determined based on the surface density information is more accurate.

Figure 19:
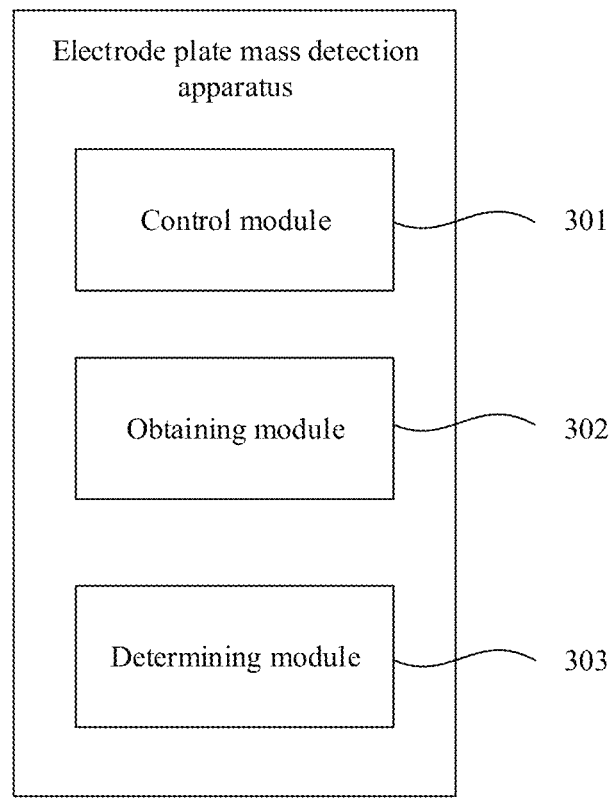
FIG. 19 is a block diagram of an electrode plate mass detection apparatus according to an embodiment of this application.

This application further provides an electrode plate mass detection apparatus. FIG. 19 is a block diagram of an electrode plate mass detection apparatus according to an embodiment of this application. Referring to FIG. 19, the apparatus includes a control module 301, an obtaining module 302, and a determining module 303. The control module 301 is configured to control a surface density gauge to create radiation surfaces of different shapes on an electrode plate; the obtaining module 302 is configured to obtain surface density information corresponding to the radiation surfaces; and the determining module 303 is configured to determine mass information of the electrode plate based on the surface density information.

According to some embodiments of this application, the surface density gauge includes a collimator, and the collimator includes a shield plate and a driving mechanism. The control module includes a first adjustment sub-module, the first adjustment sub-module being configured to control the driving mechanism to drive the shield plate to move so as to adjust the shapes of the radiation surfaces created by the surface density gauge on the electrode plate.

In the embodiments of this application, the surface density gauge further includes a radioactive source kit and a detector. The rays emitted by the radioactive source kit are projected onto the electrode plate after passing through the collimator, and the detector receives the rays passing through the electrode plate and then the collimator.

In the embodiments of this application, the shield plate is provided with a window, and when rays emitted by the radioactive source kit of the surface density gauge are projected onto the electrode plate after passing through the collimator, the driving mechanism is controlled to drive the shield plate to move. The first adjustment sub-module includes the first control unit, the first control unit being configured to control the driving mechanism to drive shield plate to move so that the rays are able to pass through the window and be projected onto the electrode plate.

In the embodiments of this application, the shield plate is provided with a plurality of windows, where the plurality of windows include a first sub-window and a second sub-window, the first sub-window and the second sub-window having different shapes; the first control unit includes a first control sub-unit, the first control sub-unit being configured to control the driving mechanism to drive the shield plate to move so that the rays are able to pass through either the first sub-window or the second sub-window and be projected onto the electrode plate.

In the embodiments of this application, the first adjustment sub-module includes a second control unit, the second control unit being configured to control the driving mechanism to drive the shield plate to move so as to adjust a shielding area of the shield plate against rays projected to the collimator in an optical axis direction of the surface density gauge.

In the embodiments of this application, the electrode plate includes a plurality of blank regions and at least one coating region arranged along a width direction of the electrode plate, the coating region(s) and the blank regions are arranged alternately, and the surface density gauge is configured to scan the electrode plate along the width direction of the electrode plate and create radiation surfaces on the electrode plate during the scanning. The control module includes a first control sub-module, the first control sub-module being configured to, during the scanning of the electrode plate by the surface density gauge, control the surface density gauge to create a first radiation surface in the blank region of the electrode plate; and during the scanning of the electrode plate by the surface density gauge, control the surface density gauge to create a second radiation surface in the coating region of the electrode plate; where, in the width direction of the electrode plate, width of the first radiation surface is less than width of the blank region, and width of the second radiation surface is less than width of the coating region.

In embodiments of this application, during a single scan of the electrode plate by the surface density gauge, the first radiation surface and the second radiation surface have different shapes.

In embodiments of this application, during one scan of the electrode plate by the surface density gauge, the first radiation surface and the second radiation surface have the same shape, and during two consecutive scans of the electrode plate by the surface density gauge, the first radiation surface and the second radiation surface have different shapes.

In an embodiment of this application, when the surface density gauge includes a collimator, the surface density gauge further includes a position detector. The first adjustment sub-module includes a third control unit and a fourth control unit. The third control unit is configured to, during scanning of the electrode plate by the surface density gauge, control the position detector to detect position information of the surface density gauge relative to the electrode plate; and the fourth control unit is configured to, based on the position information, control the driving mechanism to drive the shield plate to move.

In an embodiment of this application, the determining module includes a first obtaining sub-module and a first determining sub-module. The first obtaining sub-module is configured to obtain a mass relationship coefficient between the coating region of the electrode plate and the blank region of the electrode plate. The first determining sub-module is configured to determine the mass information of the electrode plate based on the surface density information and the mass relationship coefficient.

In an embodiment of this application, the surface density gauge includes a first surface density gauge, the mass information includes mass of slurry applied onto a first surface of the electrode plate, and the mass relationship coefficient is a mass relationship coefficient between the coating region of the electrode plate and the blank region of the electrode plate determined when the first surface of the electrode plate is uncoated with slurry; the control module is configured to, when the first surface of the coating region is coated with slurry, control the first surface density gauge to scan the electrode plate along the width direction of the electrode plate; and the obtaining module is configured to, when the first surface of the coating region is coated with slurry, detect a first surface density corresponding to the first radiation surface created by the first surface density gauge in the blank region and a second surface density corresponding to the second radiation surface created by the first surface density gauge in the coating region. The first determining sub-module is further configured to determine mass of slurry on the first surface based on the first surface density, the second surface density, and the mass relationship coefficient.

In the embodiments of this application, the control module is configured to, when the first surface of the electrode plate is uncoated with slurry, control the first surface density gauge to scan the electrode plate along the width direction of the electrode plate; and the obtaining module is configured to, when the first surface of the electrode plate is uncoated with slurry, detect a third surface density corresponding to the first radiation surface created by the first surface density gauge in the blank region of the electrode plate and a fourth surface density corresponding to the second radiation surface created by the first surface density gauge in the coating region of the electrode plate. The mass relationship coefficient is determined based on area of the first radiation surface, area of the second radiation surface, the third surface density, and the fourth surface density detected when the first surface of the electrode plate is uncoated with slurry.

In the embodiments of this application, the mass relationship coefficient includes a mass relationship sub-coefficient between each coating region of the electrode plate and the blank region of the electrode plate adjacent to the coating region, determined when the first surface of the electrode plate is uncoated with slurry. The determining module is configured to determine the mass of slurry on the first surface based on the first surface density, the second surface density, and the mass relationship sub-coefficient corresponding to the at least one coating region.

In embodiments of this application, during one scan of the electrode plate by the first surface density gauge, the first radiation surface and the second radiation surface have different shapes; alternatively, during one scan of the electrode plate by the first surface density gauge, the first radiation surface and the second radiation surface have a same shape, and during two consecutive scans of the electrode plate by the surface density gauge, the first radiation surface and the second radiation surface have different shapes.

In the embodiments of this application, the surface density gauge further includes a second surface density gauge, and the mass information further includes mass of slurry applied onto a second surface of the electrode plate, the first surface and the second surface being two opposite surfaces of the electrode plate; the control module is further configured to, when both the first surface and the second surface of the coating region are coated with slurry, control the second surface density gauge to scan the electrode plate along the width direction of the electrode plate; the obtaining module is further configured to, when both the first surface and the second surface of the coating region are coated with slurry, detect a fifth surface density corresponding to the second radiation surface created by the second surface density gauge in the coating region; and the determining module is configured to determine the mass of slurry on the second surface based on the second surface density and the fifth surface density.

In the embodiments of this application, during one scan of the electrode plate by the second surface density gauge, the second radiation surface varies in shape; or, during one scan of the electrode plate by the second surface density gauge, the second radiation surface maintains a consistent shape, and during two consecutive scans of the electrode plate by the surface density gauge, the second radiation surface varies in shape.

In the embodiments of this application, scanning tracks of the first surface density gauge and the second surface density gauge on the electrode plate include a plurality of test points, and the rays emitted by the first surface density gauge and the second surface density gauge are projected onto the electrode plate at each of the test points. Positions of a plurality of radiation surfaces created by the first surface density gauge on the electrode plate during one scan correspond one-to-one to positions of a plurality of radiation surfaces created by the second surface density gauge on the electrode plate during one scan.

In the embodiments of this application, the first radiation surface is a rectangle, the second radiation surface is a circle, and length of a side of the rectangle in the width direction C of the electrode plate is smaller than diameter of the circle.

In the embodiments of this application, the rectangle and the circle satisfy at least one of the following conditions: the width of the rectangle is greater than or equal to 5 millimeters and less than or equal to 20 millimeters, and the diameter of the circle is greater than or equal to 10 millimeters and less than or equal to 40 millimeters.

In the embodiments of this application, the electrode plate further includes thinned regions, and along the width direction of the electrode plate, the thinned regions are located on two sides of the coating region and between the blank region and the coating region; and when the surface density gauge includes a collimator, the first adjustment sub-module is further configured to, in the thinned regions, control the driving mechanism to drive the shield plate to move so as to adjust the surface density gauge to create a first radiation surface in the blank region of the electrode plate and a second radiation surface in the coating region of the electrode plate.

This application further provides an electronic device including: at least one processor; and a memory communicatively connected to the at least one processor; where, the memory stores instructions which are executable by the at least one processor, and the instructions are executed by the at least one processor to enable the at least one processor to perform the method in the foregoing embodiments.

This application further provides an electrode plate production system including the electronic device in the foregoing embodiments.

The electrode plate production system provided in the embodiments of this application can be adjusted according to the object under test to create radiation surfaces of different shapes on the electrode plate. The surface density information is determined according to the radiation surfaces of different shapes, and finally, the mass information of the electrode plate is determined according to the surface density information. Therefore, in a detection process, the shapes of the radiation surfaces can be adjusted according to positions of the electrode plate, so that the radiation surfaces are more suitable for the electrode plate, and the surface density information obtained according to the radiation surfaces is more accurate. Thus, the mass information of the electrode plate determined based on the surface density information is more accurate.

According to an implementation of some embodiments of this application, the electrode plate production system further includes a coater and a surface density gauge. The coater is configured to apply slurry onto a coating region of a surface of the electrode plate; and the surface density gauge is configured to create a radiation surface of a first shape in a blank region of the electrode plate and a radiation surface of a second shape in a coating region of the electrode plate;

where the first shape is different from the second shape.

In the embodiments of this application, the surface density gauge may be the surface density gauge in the foregoing embodiment, the first shape may be the shape of the first radiation surface, and the second shape may be the shape of the second radiation surface.

Figure 20:
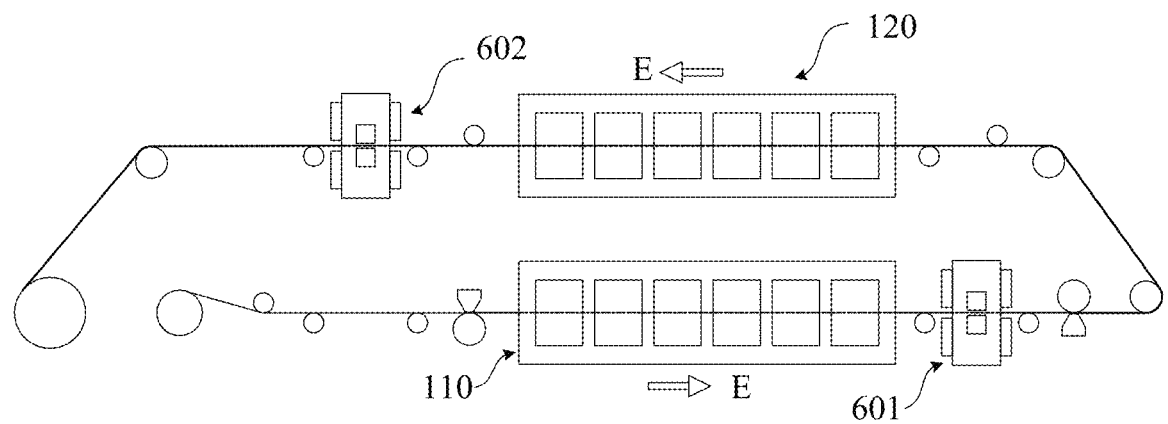
FIG. 20 is a schematic structural diagram of an electrode plate production system according to an embodiment of this application.

According to some embodiments of this application, FIG. 20 is a schematic structural diagram of an electrode plate production system according to an embodiment of this application. Referring to FIG. 20, the coater includes a first coater 110 and a second coater 120. The first coater 110 is configured to apply slurry onto a coating region of a first surface of the electrode plate. The second coater 120 is configured to apply slurry onto the coating region of the second surface of the electrode plate, the second surface being opposite the first surface. The surface density gauge includes a first surface density gauge 601 and a second surface density gauge 602. The first surface density gauge 601 is positioned after the first coater 110, and the first surface density gauge 601 is configured to create a radiation surface of the first shape in the blank region of the electrode plate and a radiation surface of the second shape in the coating region of the electrode plate when the first surface is uncoated with slurry; and the first surface density gauge 601 is configured to create a radiation surface of the second shape in the coating region of the electrode plate when the first surface is coated with slurry. The second surface density gauge 602 is positioned after the second coater 120, and the second surface density gauge 602 is configured to create a radiation surface of the second shape in the coating region of the electrode plate when the second surface is coated with slurry.

In this implementation, the first surface density gauge 601 is configured to detect the surface density of the coating region and the blank region of the first surface, and the second surface density gauge 602 is configured to detect the surface density of the coating region and the blank region of the second surface. In other words, both the first surface density gauge 601 and the second surface density gauge 602 can create a first radiation surface and a second radiation surface.

In a conveying direction E of the electrode plate, the first surface density gauge 601 is positioned between the first coater 110 and the second coater 120, and the second surface density gauge 602 is positioned after the second coater 120.

The electrode plate production system provided in the embodiments of this application can detect the masses of slurry applied onto two surfaces using only two density gauges. This reduces the number of density gauges required, simplifies the structure, and saves costs.

In some embodiments of this application, the electrode plate production system further includes a coater, a first surface density gauge, and a second surface density gauge. The coater is configured to apply slurry onto a coating region of a surface of the electrode plate; the first surface density gauge is configured to create a radiation surface of a first shape in a blank region of the electrode plate; and the second surface density gauge is configured to create a radiation surface of a second shape in a coating region of the electrode plate; where the first shape is different from the second shape.

In the embodiments of this application, the first surface density gauge creates only the first radiation surface and is configured to detect the surface density of the blank regions on two opposite surfaces of the electrode plate. The second surface density gauge crates only the second radiation surface and is configured to detect the surface density of the coating regions on two opposite surfaces of the electrode plate.

The electrode plate production system provided in the embodiments of this application can detect the masses of slurry applied onto two surfaces using only two density gauges. This reduces the number of density gauges required, simplifies the structure, and saves costs.

This application further provides a computer-readable storage medium storing a computer program, and when the computer program is executed by a processor, the method in the foregoing embodiments is implemented.

This application further provides a computer program product including a computer program, and when the computer program is executed by a processor, the method in the foregoing embodiments is executed.

Figure 21:
FIG. 21 is a flowchart of an electrode plate mass detection method according to an embodiment of this application.

Embodiments of this application provide an electrode plate mass detection method. FIG. 21 is a flowchart of an electrode plate mass detection method according to the embodiments of this application. Referring to FIG. 21, the method includes:

Step S401: Control a first surface density gauge to scan an electrode plate uncoated with slurry and to create a first radiation surface and a second radiation surface on the electrode plate.

Step S402: For the electrode plate uncoated with slurry, detect a first surface density of the first radiation surface and a second surface density of the second radiation surface.

Step S403: Based on area of the first radiation surface, area of the second radiation surface, the first surface density, and the second surface density, determine a mass relationship coefficient between the first radiation surface and the second radiation surface for the electrode plate uncoated with slurry.

Step S404: For the electrode plate coated with slurry on a first surface, control the first surface density gauge to scan the electrode plate and to create a first radiation surface in a blank region of the electrode plate and a second radiation surface in a coating region of the electrode plate.

Step S405: For the electrode plate coated with slurry on the first surface, detect a third surface density of the first radiation surface and a fourth surface density of the second radiation surface.

Step S406: Determine mass of slurry on the first surface based on the area of the first radiation surface, the area of the second radiation surface, the mass relationship coefficient, the third surface density, and the fourth surface density.

Step S407: For the electrode plate coated with slurry on a second surface, control a second surface density gauge to scan the electrode plate and to create a first radiation surface in the blank region of the electrode plate and a second radiation surface in the coating region of the electrode plate.

Step S408: For the electrode plate coated with slurry on the second surface, detect a fifth surface density of the second radiation surface.

Step S409: Determine mass of slurry on the second surface based on the area of the second radiation surface, the third surface density, and the fifth surface density.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. An electrode plate mass detection method, wherein the method comprises:
controlling at least one surface density gauge to scan an electrode plate along a width direction of the electrode plate and create a plurality of radiation surfaces of different shapes on the electrode plate during the scanning of the electrode plate, wherein the at least one surface density gauge comprises a collimator, the collimator comprising a shield plate and a driving mechanism, wherein the electrode plate comprises a plurality of blank regions, at least one coating region arranged along a width direction of the electrode plate, and thinned regions, the at least one coating region and the blank regions are arranged alternately, along the width direction of the electrode plate, the thinned regions are located on two sides of the at least one coating region and between the blank region and the at least one coating region;
controlling the driving mechanism to drive the shield plate to move so as to adjust the shapes of the plurality of radiation surfaces created by the at least one surface density gauge on the electrode plate, wherein, controlling the driving mechanism to drive the shield plate further comprises:
during the scanning of the electrode plate by the surface density gauge, controlling the driving mechanism to drive the shield plate to move, in the thinned regions, so as to adjust the at least one surface density gauge to create a first radiation surface of the plurality of radiation surfaces in the blank region of the electrode plate and a second radiation surface of the plurality of radiation surfaces in the at least one coating region of the electrode plate, wherein in the width direction of the electrode plate, a width of the first radiation surface is less than a width of the blank region, and a width of the second radiation surface is less than a width of the at least one coating region;
obtaining surface density information corresponding to the plurality of radiation surfaces; and
determining mass information of the electrode plate based on the surface density information.

2. The method according to claim 1, wherein the at least one surface density gauge further comprises a radioactive source kit and a detector, the radioactive source kit and the detector satisfying at least one of the following conditions:
rays emitted by the radioactive source kit are projected onto the electrode plate after passing through the collimator;
the detector receives rays passing through the electrode plate and then the collimator.

3. The method according to claim 1, wherein the shield plate is provided with a plurality of windows, the plurality of windows comprising a first sub-window and a second sub-window, and the first sub-window and second sub-window having different shapes; and
the controlling the driving mechanism to drive the shield plate to move further comprises:
controlling the driving mechanism to drive the shield plate to move so that the rays are able to pass through either the first sub-window or the second sub-window and be projected onto the electrode plate.

4. The method according to claim 1, wherein during one scan of the electrode plate by the at least one surface density gauge, the first radiation surface and the second radiation surface have a same shape; and
during two consecutive scans of the electrode plate by the at least one surface density gauge, the first radiation surface and the second radiation surface have different shapes.

5. The method according to claim 1, wherein the determining the mass information of the electrode plate based on the surface density information further comprises:
obtaining a mass relationship coefficient between the at least one coating region of the electrode plate and the blank region of the electrode plate; and determining the mass information of the electrode plate based on the surface density information and the mass relationship coefficient.

6. The method according to claim 5, wherein the at least one surface density gauge comprises a first surface density gauge, the mass information comprises mass of slurry applied onto a first surface of the electrode plate, and the mass relationship coefficient is a mass relationship coefficient between the at least one coating region of the electrode plate and the blank region of the electrode plate determined when the first surface of the electrode plate is uncoated with slurry;

the controlling the at least one surface density gauge to scan the electrode plate along a width direction of the electrode plate and create the plurality of radiation surfaces of different shapes on the electrode plate further comprises:

when the first surface of the at least one coating region is coated with slurry, controlling the first surface density gauge to scan the electrode plate along the width direction of the electrode plate;

the obtaining the surface density information corresponding to the plurality of radiation surfaces further comprises:

when the first surface of the at least one coating region is coated with slurry, detecting a first surface density corresponding to the first radiation surface created by the first surface density gauge in the blank region and a second surface density corresponding to the second radiation surface created by the first surface density gauge in the at least one coating region; and the determining the mass information of the electrode plate based on the surface density information and the mass relationship coefficient further comprises:

determining the mass of slurry on the first surface based on the first surface density, the second surface density, and the mass relationship coefficient.

7. The method according to claim 6, wherein the controlling the at least one surface density gauge to scan the electrode plate along a width direction of the electrode plate and create the plurality of radiation surfaces of different shapes on the electrode plate further comprises:

when the first surface of the electrode plate is uncoated with slurry, controlling the first surface density gauge to scan the electrode plate along the width direction of the electrode; and the obtaining the surface density information corresponding to the plurality of radiation surfaces further comprises:

when the first surface of the electrode plate is uncoated with slurry, detecting a third surface density corresponding to the first radiation surface created by the first surface density gauge in the blank region of the electrode plate and a fourth surface density corresponding to the second radiation surface created by the first surface density gauge in the at least one coating region of the electrode plate;

wherein the mass relationship coefficient is determined based on area of the first radiation surface, area of the second radiation surface, the third surface density, and the fourth surface density detected when the first surface of the electrode plate is uncoated with slurry.

8. The method according to claim 6, wherein the mass relationship coefficient comprises a mass relationship sub-coefficient between each coating region of the at least one coating region of the electrode plate and the blank region of the electrode plate adjacent to the coating region, determined when the first surface of the electrode plate is uncoated with slurry; and the determining mass of slurry on the first surface based on the first surface density, the second surface density, and the mass relationship coefficient comprises:

determining the mass of slurry on the first surface based on the first surface density, the second surface density, and the mass relationship sub-coefficient corresponding to the at least one coating region.

9. The method according to claim 6, wherein during one scan of the electrode plate by the first surface density gauge, the first radiation surface and the second radiation surface have different shapes; or during one scan of the electrode plate by the first surface density gauge, the first radiation surface and the second radiation surface have a same shape, and during two consecutive scans of the electrode plate by the at least one surface density gauge, the first radiation surface and the second radiation surface have different shapes.

10. The method according to claim 6, wherein the at least one surface density gauge further comprises a second surface density gauge, and the mass information further comprises mass of slurry applied onto a second surface of the electrode plate, the first surface and the second surface being two opposite surfaces of the electrode plate;

the controlling the at least one surface density gauge to scan the electrode plate along a width direction of the electrode plate and create the plurality of radiation surfaces of different shapes on the electrode plate further comprises:

when both the first surface and the second surface of the at least one coating region are coated with slurry, controlling the second surface density gauge to scan the electrode plate along the width direction of the electrode plate;

the obtaining the surface density information corresponding to the plurality of radiation surfaces further comprises:

when both the first surface and the second surface of the at least one coating region are coated with slurry, detecting a fifth surface density corresponding to the second radiation surface created by the second surface density gauge in the at least one coating region; and the determining mass information of the electrode plate based on the surface density information comprises:

determining the mass of slurry on the second surface based on the second surface density and the fifth surface density.

11. The method according to claim 10, wherein scanning tracks of the first surface density gauge and the second surface density gauge on the electrode plate comprise a plurality of test points, and the rays emitted by the first surface density gauge and the second surface density gauge are projected onto the electrode plate at each of the test points;

wherein positions of a plurality of radiation surfaces created by the first surface density gauge on the electrode plate during one scan correspond one-to-one to positions of a plurality of radiation surfaces created by the second surface density gauge on the electrode plate during one scan.

12. An electrode plate production method, comprising:
applying slurry onto a coating region of an electrode plate; and
detecting mass information of the electrode plate using the method according to claim 1.

13. The method according to claim 12, wherein the applying slurry onto the coating region of the electrode plate further comprises:
- using a first coater to apply slurry onto a coating region of a first surface of the electrode plate; and
- using a second coater to apply slurry onto a coating region of a second surface of the electrode plate, the second surface being opposite the first surface;
- the at least one surface density gauge comprises a first surface density gauge positioned after the first coater and a second surface density gauge positioned after the second coater; and the detecting the mass information of the electrode plate further comprises:
- before slurry is applied onto the coating region of the first surface of the electrode plate, using the first surface density gauge to create a radiation surface of a first shape in the blank region of the electrode plate and a radiation surface of a second shape in the coating region of the electrode plate;
- after slurry is applied onto the coating region of the first surface of the electrode plate, using the first surface density gauge to create a radiation surface of the second shape in the coating region of the electrode plate; and
- after slurry is applied onto the coating region of the second surface of the electrode plate, using the second surface density gauge to create a radiation surface of the second shape in the coating region of the electrode plate;
- wherein the first shape is different from the second shape.

14. A non-transitory computer-readable storage medium storing a computer program, wherein when the computer program is executed by a processor, the computer program causes the processor to perform the method according to claim 1.

* * * * *